(12) United States Patent
Elektorowicz et al.

(10) Patent No.: US 8,147,700 B2
(45) Date of Patent: Apr. 3, 2012

(54) WASTEWATER TREATMENT SYSTEM AND METHOD

(76) Inventors: Maria Elektorowicz, Montreal (CA);
Jan Oleszkiewcz, Winnipeg (CA);
Khalid Bani-Melhem, Montreal (CA)

( * ) Notice: Subject to any disclaimer, the term of this patent is extended or adjusted under 35 U.S.C. 154(b) by 362 days.

(21) Appl. No.: 12/553,680

(22) Filed: Sep. 3, 2009

(65) Prior Publication Data

US 2010/0051542 A1 Mar. 4, 2010

Related U.S. Application Data

(60) Provisional application No. 61/094,266, filed on Sep. 4, 2008.

(51) Int. Cl.
*B01D 61/14* (2006.01)
*B01D 61/42* (2006.01)
*C02F 3/30* (2006.01)
*B01D 61/00* (2006.01)

(52) U.S. Cl. ............ 210/650; 210/748.01; 210/748.17; 210/243; 210/601; 210/620; 210/630; 210/631

(58) Field of Classification Search .................. None
See application file for complete search history.

(56) References Cited

U.S. PATENT DOCUMENTS

| | | | | |
|---|---|---|---|---|
| 5,679,257 A | * | 10/1997 | Coate et al. | 210/695 |
| 6,045,707 A | * | 4/2000 | Scrudato et al. | 210/748.18 |
| 2004/0245184 A1 | * | 12/2004 | Umezawa et al. | 210/748 |
| 2008/0073288 A1 | * | 3/2008 | Fan et al. | 210/748 |

* cited by examiner

*Primary Examiner* — Krishnan S Menon
(74) *Attorney, Agent, or Firm* — Ryan W. Dupuis; Kyle R. Satterthwaite; Ade & Company, Inc.

(57) ABSTRACT

A wastewater treatment system and method comprises a treatment chamber having a filtration membrane spanning an effluent outlet of the chamber and a pair of electrodes in the treatment chamber so as to be in communication with the wastewater. An electrical potential difference is applied between the electrodes such that one of the electrodes functions as an anode and one of the electrodes functions as a cathode. A flow of fluid is induced out of the treatment chamber through the filtration membrane to the effluent outlet. Accordingly the treatment chamber is arranged to biologically treat the wastewater, electrochemically treat the wastewater and mechanically filter the wastewater through the filtration membrane commonly therein.

19 Claims, 17 Drawing Sheets

WASTEWATER TREATMENT SYSTEM AND METHOD

This application claims the benefit under 35 U.S.C. 119(e) of U.S. provisional application Ser. No. 61/094,266, filed Sep. 4, 2009.

FIELD OF THE INVENTION

The present invention relates to a wastewater treatment system and method in which wastewater is biologically treated, electrochemically treated and filtered through a filtration membrane in a common treatment chamber.

BACKGROUND

One of the major challenges facing many countries around the world is to provide clean water for various human activities (drinking, agricultural and industrial) and to cover the needs of the population growth. Although the needs for clean water are a critical issue in developing countries, the developed countries are also suffering from the continuous shortage in freshwater resources due to water pollution from industrial processes and urbanization. Subsequently, the needs for wastewater treatment in developed countries have become a pressing environmental issue due to the increasing requirements in effluent quality regulations.

For example, one of an important environmental issue is the biological nutrient removal (BNR). Although many wastewater treatment plants are capable of biological nutrient removal, the regulations are changing in some areas to take wastewater treatment to a higher level requiring enhanced nutrient removal (ENR). Enhanced nutrient removal most often requires phosphorus levels to be less than 0.3 mg/L and total nitrogen of 3 mg/L or less. The lowering of nitrogen and phosphorus levels to increase the quality of the wastewater effluent, (i.e. enhanced nutrient removal (ENR)), is accomplished through the use of advanced wastewater technologies.

Consequently, the currently available conventional wastewater treatment technologies are no longer responding to new standards, and there is an increasing desire for the development of innovative, more effective and inexpensive techniques for wastewater treatment.

On the other hand, the continuous pollution of the receiving bodies highlights the trend to further manage treated wastewaters by changing the total water recycle approach, which promotes ecological sustainability by recognizing the treated wastewater as a water source instead of a wasted medium. This new view may lead to a reduction of the demand for water from existing water resources.

To fulfill the above requirements, an attention on advanced wastewater treatment has become an international hot issue during the last years. Membrane processes belong to this group and attract a high degree of attention from researchers.

In the last decades of the $20^{th}$ century, membrane technology (MT), especially pressure driven membrane group, has been given great attention and it has been proven to be a promising technology for the purification of drinking water, for wastewater treatment and for reuse applications.

Membrane technology was firstly limited to the tertiary treatment stage for disinfection and polishing of the effluent from the secondary treatment. However, in 1969, membrane technology was integrated directly with the activated sludge process to form one technology called membrane bioreactor technology (MBR). The idea of MBR technology was first developed to replace the secondary clarifier in the activated sludge process (ASP) to overcome the settling difficulties associated with the process and to get a good quality effluent. Although MBR solved many problems associated in ASP, fouling of the membrane is till the major factor in decreasing the wide-spread use of the process. Originally, the membrane module was utilized outside the reactor, but further development of the process made the membrane module integrated inside the bioreactor. This new configuration was called a submerged membrane bioreactor (SMBR). Consequently, the MBR technology has two configurations in terms of process operation: external and submerged membrane bioreactors. The SMBR overcomes the limits of the external one by the lower power cost; therefore, most of the recent studies focus on the development of this type of configuration.

The SMBR as a second generation MBR technology can lead to a revolution in wastewater treatment methods if the fouling problem can be reduced. It has been reported that SMBR would be a good alternative for wastewater treatment plants in comparison with ASP if the fouling problem is finally eliminated.

Accordingly, for SMBR systems to be commercially competitive in comparison with ASP, further development of the process is required to decrease the fouling rate of the membrane. In this domain, many studies have been conducted to reduce this problem. In general, there are many methods to reduce fouling in SMBR technology. Those methods can be grouped by three distinct approaches: cleaning the membrane unit, optimizing the operating parameters and improving the wastewater characteristics. Membrane cleaning is the common approach used in most of the SMBR applications. Cleaning the membrane is achieved physically by backwashing the permeate or back flushing using a high flow rate stream of air. This technique results in an increase in the operating costs and the high flow rate of air may cause damage for the membrane module. On the long run, membrane can be washed chemically to recover the membrane permeability.

Optimization the operating parameters includes the selection of the best operating conditions in terms of aeration, sludge retention time (SRT), hydraulic retention time (HRT) and MLSS concentration in the bioreactor to minimize the fouling on the membrane.

Improving the characteristics of the treated wastewater has been proven an effective approach in reducing the fouling in SMBR applications. This approach includes the addition of chemical coagulant as alum and iron salts to increase the floc size of the MLSS solution or adding adsorptive materials like high concentration of powdered activated carbon material.

Increasing the size of the MLSS flocs solution by coagulation has been proven to be an effective method. However, the addition of chemicals to the wastewater may cause side effects by producing byproducts or increasing the volume of sludge in the reactor. Another technology to create coagulation inside the system, suggested by the current inventors, is introducing electrokinetic processes to biological process. In this case, one of the electrokinetic processes is electro-coagulation (EC). EC has been proved to be a good method for coagulation in wastewater. In comparison with the chemical coagulation (CC) processes, electrocoagulation (EC) has many advantages: no liquid chemical is added, alkalinity is not consumed, and the EC process requires less coagulant and produces less sludge.

SUMMARY OF THE INVENTION

In the present invention, no coagulate addition is planned, leading to the minimization of operation costs and increasing the quality of both effluent and wasted solids.

The proposed design integrates three main processes in one unit: a biological process, a membrane filtration process and an electrokinetic process. The overall configuration of this system is named the submerged electro-bioreactor (SMEBR). For this design to be successful, the treatment of wastewater with the SMEBR system process should include biodegradation, electro-coagulation, and electro-sedimentation and filtration trough no-fouled membranes. No previous work has been reported to integrate MBR system with electrokinetics in one unit as a hybrid technology.

According to one aspect of the invention there is provided a wastewater treatment method for treating wastewater comprising:

providing a treatment chamber having an effluent outlet;

placing the wastewater to be treated in the treatment chamber;

providing a filtration membrane spanning the effluent outlet;

providing a pair of electrodes in the treatment chamber so as to be in communication with the wastewater;

applying an electrical potential difference between the electrodes such that one of the electrodes functions as an anode and one of the electrodes functions as a cathode; and inducing a flow of fluid in the wastewater out of the treatment chamber through the filtration membrane to the effluent outlet of the treatment chamber.

The present invention provides a hybrid technology for wastewater treatment referred to herein as Submerged Membrane Electro-bioreactor (SMEBR) that incorporate biotechnology, membrane processes and electrochemical phenomena in one treatment chamber. Wastewater after preliminary treatment process (with and without primary treatment) enters into electrokinetic section of the chamber where BOD (biological oxygen demand) and TSS (total suspended solids) removal take place simultaneously with electrochemical electro-coagulation, nutrient and metals removal. After this bio-electrokinetic treatment, wastewater pass towards submerged membrane for more advance removal of COD (chemical oxygen demand), TSS, nutrients, as well as other micro- and nano-scale impurities. SMEBR opens the door for it applications in many fields of water and wastewater treatments technologies including municipal wastewater, food industry, as well as pulp and paper industry.

The main objective of this invention is to improve the efficiency of wastewater treatment process, by designing a new system promoting the chain of simultaneous and subsequent processes such as biodegradation, electrochemical reactions and membrane processes in one Submerged Membrane Electro-Bioreactor (SMEBR) leading to: 1) increasing the effluent (permeate) quality, 2) minimizing the amount of sludge produced, 3) decreasing the membrane fouling problem (observed in all common membrane processes), and finally, 4) enhancing the performance of the wastewater treatment unit.

The SMEBR consists of centrally located a series of membranes. Circular metallic mesh electrodes are fixed at a distance around membranes. Mesh electrodes prevent the resistance of water flow toward membranes and provide an accurate DC potential gradient to create electrochemical processes within wastewater.

The SMEBR is governed by the following fluid motions:

1) Supply of wastewater from outside across perforated electrode (generally anode) in order to undergo biological and electrochemical treatment between electrodes.

2) Air flow from bottom to the top. Air is used in SMEBR systems for three main reasons: to: i) supply sufficient oxygen for the microorganism to achieve the biological process; ii) reduce the fouling rate at the membranes; and iii) achieve good mixing for the mixed liquor solution in the bioreactor. According to the above explanation, air bubbles will transfer from the bottom toward the top of the reactor.

3) Flocs electro-formation and electro-settling. This phenomenon will form flocs in the mixed liquor, which accelerate settling and permit for removal of phosphorous and other impurities.

4) Treated water flow through perforated electrode (generally cathode) toward membrane unit. According to the suction pump connected to membrane unit, treated water will flow from the bulk solution toward the membrane as shown in FIG. 6, which shows top view of the reactor in which the flow of water streams is shown.

The treatment of wastewater with SMEBR systems process should include biodegradation, electro-coagulation, electro-sedimentation by control of particular operation parameters: i) Air Supply, ii) Electrical parameters (potential gradient, current density), iii)

Sludge retention time, iv) Hydraulic retention time.

The application of proposed SMEBR technology addresses the following points:

1. Quality of permeate is higher in SMEBR in comparison with SMBR.

2. The fouling of membrane decreases and its longevity increases due to wastewater pretreatment in electrokinetic part of chamber.

3. The amount of sludge produced from SMEBR decreases in comparison with SMBR alone and any other common wastewater treatment method.

4. The nutrients removal takes place within the same chamber without addition of chemicals, due to biological processes as well as electro-coagulation and electro-precipitation.

5. The metal removal takes place within the same chamber due to electro-migration of metallic species towards respected electrodes and electro-precipitation.

6. The removal of organic and inorganic micro-pollutants (e.g. endocrine disruptors) due to electrokinetic transports (electro-migration, electrophoresis, electro-co precipitation) within the chamber.

To validate the invention, experimental work was done and throughout sequential three phases in order to optimize various, biological, physic-chemical, electrode material and electrical parameters. In phase I, an optimization of electrical voltage for designed setup was carried out on small scale bioreactor without using membrane cell. Activated sludge mixed liquor suspended solid (MLSS) solution was exposed to different DC fields (1, 2, 4, 6 V/cm). The DC field of 1 V/cm was found to be the best DC for the application in SMEBR system.

In phase II, SMEBR system investigated to decrease fouling problem associated with SMBR technology. Phase II was expanded for 53 days in which iron was used for the anode and cathode materials. SMEBR system was operated under two stages (with and without DC field) at a constant transmembrane pressure, and constant low voltage gradient with 15 minutes ON to 45 minutes OFF time exposure to DC. The results from this phase showed an excellent output during the continuous operation. Applied alternative DC in SMBR system enhanced the membrane filterability by 35% on average. The effluent after SMEBR treatment of synthetic wastewater had no colour and no odour. Furthermore, showed: i) >96% removal efficiency for COD; ii) 98% removal for phosphorous, iii) 70% removal of nitrogen-ammonia Phase III was expanded for 65 days and aluminum was selected as anode material instead of iron. In this phase, the SMEBR system was run under four stages in which Stage I was the controlled stage operated without operation of DC. The objective of stage II was to investigate better the SMEBR system to run membrane filtration versus the mode of application of electro-coagulation.

To examine the effect of time exposure to DC, SMEBR system was operated with 15 minutes ON to 45 minutes OFF time exposure to DC in stage III, while in stage IV, SMEBR system was operated with 15 minutes ON to 105 minutes OFF time exposure to DC. The output results of phase III showed the following results:

The best results showed in stage IV, where the maximum percentage reduction in membrane flux was less than 40% (without cleaning of membranes) and the SMEBR system operated at constant flux days when the time of DC was 15 minutes ON to 105 minutes OFF.

The removal efficiency of $NH_3$—N fluctuated between 70-80% during the operation period I.

The SMEBR system showed excellent removal efficiency with respect to organic compound as COD—higher than 95% in all stages.

The SMBR system showed excellent removal efficiency with respect to phosphorous as $PO_4$—P. On average, the % reduction in $PO_4^-$—P was higher than 97% in all stages.

The method preferably includes biologically treating the wastewater, electrochemically treating the wastewater and filtering the wastewater through the filtration membrane commonly in the treatment chamber. Preferably the anode and the cathode are located in the treatment chamber and the electrical potential difference is applied between the anode and the cathode such that micro-organisms in the wastewater are permitted to biologically process the wastewater.

The fluid flow may be induced only after the electrical potential difference has been applied between the anode and the cathode. More particularly, the electrical potential difference may be applied between the anode and the cathode before the wastewater is arranged to communicate with the filtration membrane.

The electrical potential difference may be cycled between a first state in the electrical potential difference is zero and a second state in which the electrical potential difference is non-zero. In some embodiments, the second state is longer than the first state.

The cathode may be located in the treatment chamber to define a second treatment zone between the cathode and the membrane and the anode may be located in the treatment chamber to define a first treatment zone between the anode and the cathode which is outside of the second treatment zone. The first and second treatment zones are preferably in communication with one another across the cathode.

The membrane and the outlet preferably generally centrally in the treatment chamber with the anode and the cathode being formed so as to be generally annular about the membrane.

The cathode may be positioned to be spaced partway between the anode and the membrane spanning the outlet.

Preferably each of the anode and the cathode comprise a conductive body having passages arranged to receive wastewater flow therethrough.

The method preferably includes collecting metals in the wastewater adjacent at least one of the anode and the cathode. The method may further comprise collecting phosphorous from the wastewater on flocs.

The method may further comprise forming flocculants in the wastewater by electro-coagulation.

In some embodiments, the anode may comprise aluminum or iron.

The electrical potential difference may be applied in the form of a direct current field gradient which is less than 20 V/cm, and more preferably less than 5 V/cm, for example near 1 V/cm.

There may be provided an effluent pump having an inlet in communication with the outlet of the treatment chamber for inducing the flow of fluid out of the treatment chamber through the membrane by operating the effluent pump.

Air may be injected into the treatment chamber adjacent a bottom end of the treatment chamber and at the outlet which is surrounded by the membrane. The air may be directed across the membrane. The air may also be directed into the wastewater so as to mix the wastewater and/or provide sufficient oxygen for micro-organisms in the wastewater to biologically process the wastewater.

The electrical potential difference may be applied between the electrodes such that the electrodes alternately function as the anode and the cathode.

Alternatively, the electrical potential difference may be applied between the electrodes in a form which alternates between a direct current between the anode and the cathode and an alternating current between the anode and the cathode.

According to a second aspect of the present invention there is provided a wastewater treatment system for treating wastewater comprising:

a treatment chamber arranged to receive the wastewater therein, the treatment chamber having an effluent outlet arranged to receive a flow of treated fluid from the treatment chamber therethrough;

a filtration membrane spanning the effluent outlet;

a pair of electrodes supported in the treatment chamber so as to be arranged to communicate with the wastewater;

a power supply arranged to apply an electrical potential difference between the pair of electrodes such that one of the electrodes functions as an anode and one of the electrodes functions as a cathode;

a pump arranged to induce the flow of treated fluid through the filtration membrane to the outlet of the treatment chamber.

There may be provided a control arranged to operate the power supply such that the electrical potential difference is arranged to be cycled between a first state in the electrical potential difference is zero and a second state in which the electrical potential difference is non-zero.

The membrane and the outlet may be generally centrally located in the treatment such that the anode and the cathode are generally annular about the membrane. The cathode may be located partway in between the anode and the membrane spanning the outlet.

Preferably each of the anode and the cathode comprises a conductive body having passages arranged to receive wastewater.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
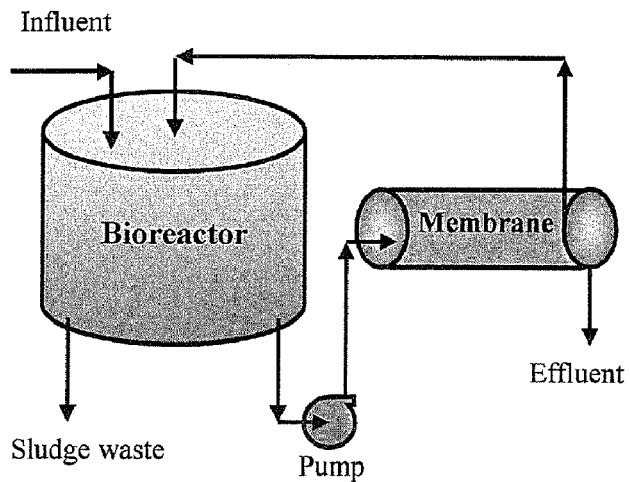
FIG. 1(a) is a schematic representation of an external recirculation wastewater treatment system.
FIG. 1(b) is a schematic representation of a submerged MBR wastewater treatment system.
Figure 1:
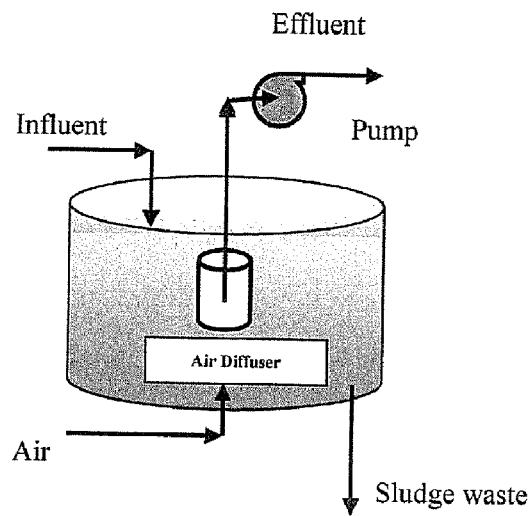

Referring to the accompanying figures there is illustrated a wastewater treatment system generally indicated by reference number 10. More particularly the system 10 comprises a submerged membrane electrobioreactor otherwise referred to herein as SMEBR.

The system 10 generally comprise a treatment chamber 12 which is generally cylindrical in shape having an upright peripheral wall 14 enclosed at a bottom end 16 by a floor and at top end by a top wall 18.

A waste inlet 20 communicates with the treatment chamber 12 adjacent the peripheral wall 14 thereof. A waste pump 22 includes an inlet in communication with a separate feed reservoir 24 and an outlet in communication through the peripheral wall 14 of the treatment chamber. In this manner waste material in the feed reservoir can be pumped by the waste pump 22 into the treatment chamber at a suitable rate corresponding to a treatment rate of the treatment chamber 12.

The treatment chamber further comprises an effluent outlet 26 communicating through the top wall at a central location in the treatment chamber. The effluent outlet 26 communicates with the inlet of an effluent pump 28 which pumps treated effluent from the treatment chamber to a separate effluent tank 30 for storing the effluent therein. The effluent outlet 26 comprises a pipe extending into the chamber having an open bottom end in communication centrally in the chamber adjacent the top end.

A filtration membrane module 32 is provided centrally in the treatment chamber for spanning the effluent outlet 26 so that the effluent must pass through the filtration membrane in order to reach the outlet and exit the chamber. The filtration membrane 32 is also generally cylindrical in shape spanning a majority of a height of the treatment chamber concentric with the surrounding peripheral wall. The filtration membrane 32 surrounds an outlet zone 34 centrally in the treatment chamber which is in open communication with the effluent outlet 26.

A pair of electrodes is mounted in the treatment chamber so as to be submerged in the waste therein. The electrodes comprise a first electrode 36 adjacent the peripheral wall and a second electrode 38 positioned partway between the filtration membrane module and the first electrode. Each of the first and second electrodes comprises a generally cylindrical wall of conductive material spanning a full height of the chamber between the top and bottom ends thereof and being positioned concentrically with the filtration membrane and the surrounding peripheral wall of the chamber. Each of the conductive bodies forming the first and second electrodes is perforated to define an open mesh having a plurality of through passages through which wastewater can flow during the treatment process.

The first electrode is positioned adjacent the peripheral wall to be spaced slightly inward therefrom in the radial direction by having a diameter which is slightly smaller than the diameter of the peripheral wall of the chamber to define an annular inlet zone 40 between the chamber wall and the anode 36 which is in communication with the waste inlet 20 of the chamber. The inlet zone at the other side of the first electrode receives the wastewater initially from the inlet of the chamber prior to the wastewater flowing through the openings in the first electrode 36 towards the outlet centrally located in the chamber during operation.

The second electrode 38 has a smaller diameter than the first electrode but a greater diameter than the filtration membrane 32 so that the resulting cylindrical wall forming the second electrode is spaced inwardly from the first electrode but spaced outwardly from the filtration membrane to be spaced evenly partway therebetween in the radial direction.

A power supply 42 is connected between the two electrodes to produce an electrical potential difference there-across in the treatment chamber. Typically the first electrode adjacent the peripheral wall is connected to the power supply so as to function as an anode while the second electrode 38 is coupled to the power supply to act as a cathode. A typical electrical potential applied between the cathode and the anode may be less than 20 V/cm, and more preferably less then 5 V/cm, for example in the order of 1 V/cm.

A suitable controller 44 is coupled to the power supply 42 and includes a timer 46 for controlling operation of the power supply. The controller permits the electrical potential difference applied by the power supply to be cycled between an active state and an inactive state as may be desired. Furthermore, the controller can alternate between an alternating current mode and a direct current mode applied to the two electrodes. In particular the controller may permit the power supply to be coupled to the electrodes such that the electrodes alternately function as anode and cathode opposite from one another.

The positioning of the cathode partway between the electrode functioning as the anode and the filtration membrane defines a first treatment zone 48 which is annular in shape and which spans the gap between the anode and the cathode. The cathode placement also defines a second treatment zone 50 which also comprises an annular space and which spans the gap between the filtration membrane and the surrounding cathode.

Operation of the effluent pump 28 causes effluent to be removed from the central area in the chamber to induce a flow of wastewater from the location of the inlet at the peripheral wall, through the anode across the first treatment zone 48 and subsequently through the cathode across the second treatment zone to the membrane.

A first air injector 52 communicates through the bottom of the chamber to a diffuser membrane 53 located centrally in the chamber at the bottom end thereof directly below the filtration membrane. Air is injected into the chamber from the diffuser such that a flow of injected air is directed upwardly through the chamber at the centre thereof and such that the injected air flows across the upright filtration membrane walls. The injected air by the first air injector thus serves to clear debris from the membrane as well as serving to mix the flow of waste being treated from top to bottom in the treatment chamber while also partly contributing to treatment reactions taking place at the cathode and in the treatment zone into which the first air injector 52 injects air.

A second air injector 54 is also provided for injecting air into the chamber adjacent the bottom end, however, in the first treatment zone instead of the second treatment zone. The second air injector 54 communicates with an annular aeration tube 56 which is mounted concentrically with the cathode and anode adjacent the bottom of the chamber so as to be positioned partway between the anode and cathode in the first treatment zone. Air injected into the aeration tube 56 is subsequently directed upwardly through the chamber to similarly contribute to mixing of the waste being treated as well as contributing to treatment reactions at the anode and in the first treatment zone. The aeration tube 56 is arranged to inject air into the chamber therefrom about a full circumference of the chamber between the anode and cathode.

A sludge pump 58 also communicates with the interior of the treatment chamber 12 adjacent the bottom thereof for removing sludge material.

The system 10 may be operated as a batch system in which a prescribed amount of waste is initially placed in the chamber for dewatering by removing the effluent from the treatment chamber. Alternatively, the system may be operated as a continuous flow from the inlet at the peripheral wall to the effluent and sludge outlets more centrally located. Typically, an electrical potential is applied between the anode and cathode for an elapsed period of time or prescribed duration prior to operation of the effluent pump to remove effluent and induce flow from the anode at the peripheral inlet to the cathode nearer to the central outlet. Applying the electrical potential difference permits electrochemically treatment of the wastewater as well as biologically treating the wastewater for an elapsed duration prior to dewatering and filtering the wastewater through the filtration membrane. Cycling the electrical potential applied to the electrodes between ON and OFF states or/and alternating either the current being applied or/and the designation of anode or cathode can have various effects on the treatment.

By additionally injecting air in the first and second treatment zones, the upward flow of air from the bottom to the top aides in mixing and contributes to various treatment reactions within the chamber. The injection of air and/or the application of the electrical potential difference between the electrodes provide an optimal environment for micro-organisms in the wastewater to be permitted to also biologically process the wastewater.

As described herein the distinguishing point between the proposed designed method in this research and the other studies in the literature is the integration of three processes, that is to say, biological, electrochemical and filtration into one hybrid unit as an advance wastewater treatment method. The original design of the SMEBR system appears to lies at the intersection of three more fundamental technologies: biodegradation, electrochemistry (in majority represented by the electro-coagulation phenomenon) and membrane filtration.

Figure 3:
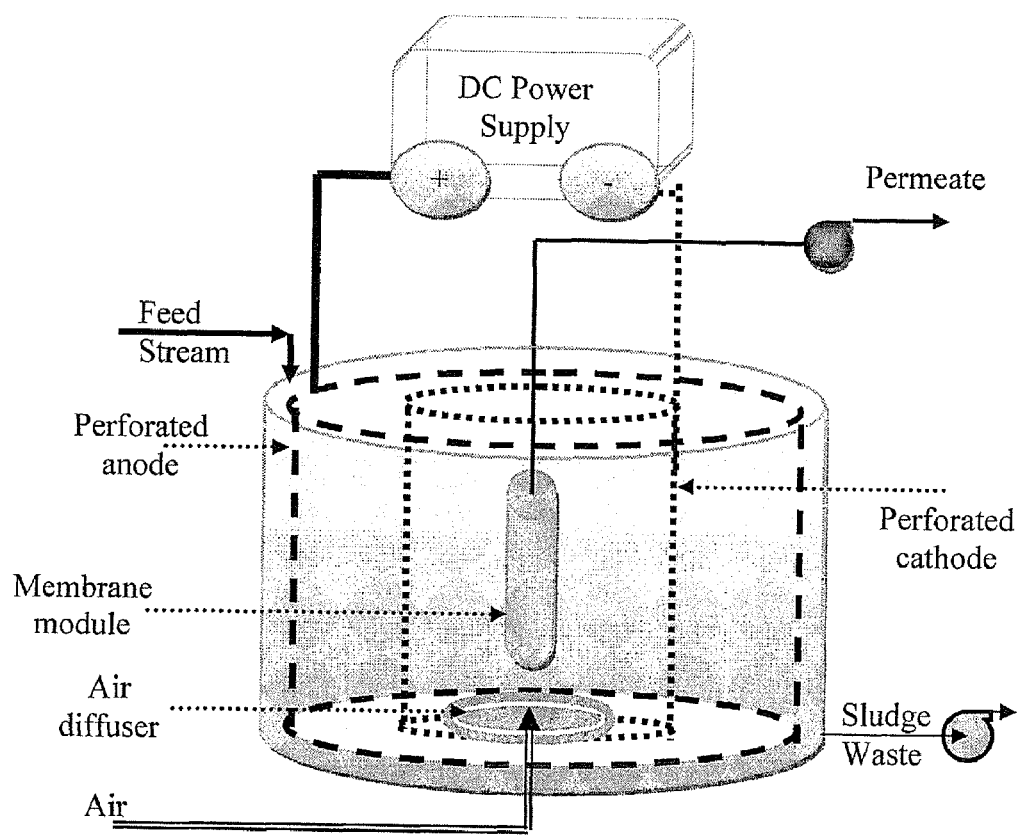
FIG. 3 is a schematic representation of an experimental configuration of the SMEBR system.

The schematic diagram in FIG. 3 illustrates the idea of the SMEBR configuration. The selected design of the SMEBR system divides the hybrid reactor into two zones, shown in FIG. 4. Zone I (electro-bioreactor) is boarded between the external wall of the reactor to the cathode and Zone II is boarded from the cathode to the membrane module. Generally in Zone I, three processes take place: biodegradation, electro-coagulation and electro-sedimentation, while Zone II has two processes: further biodegradation and membrane filtration.

Figure 6:
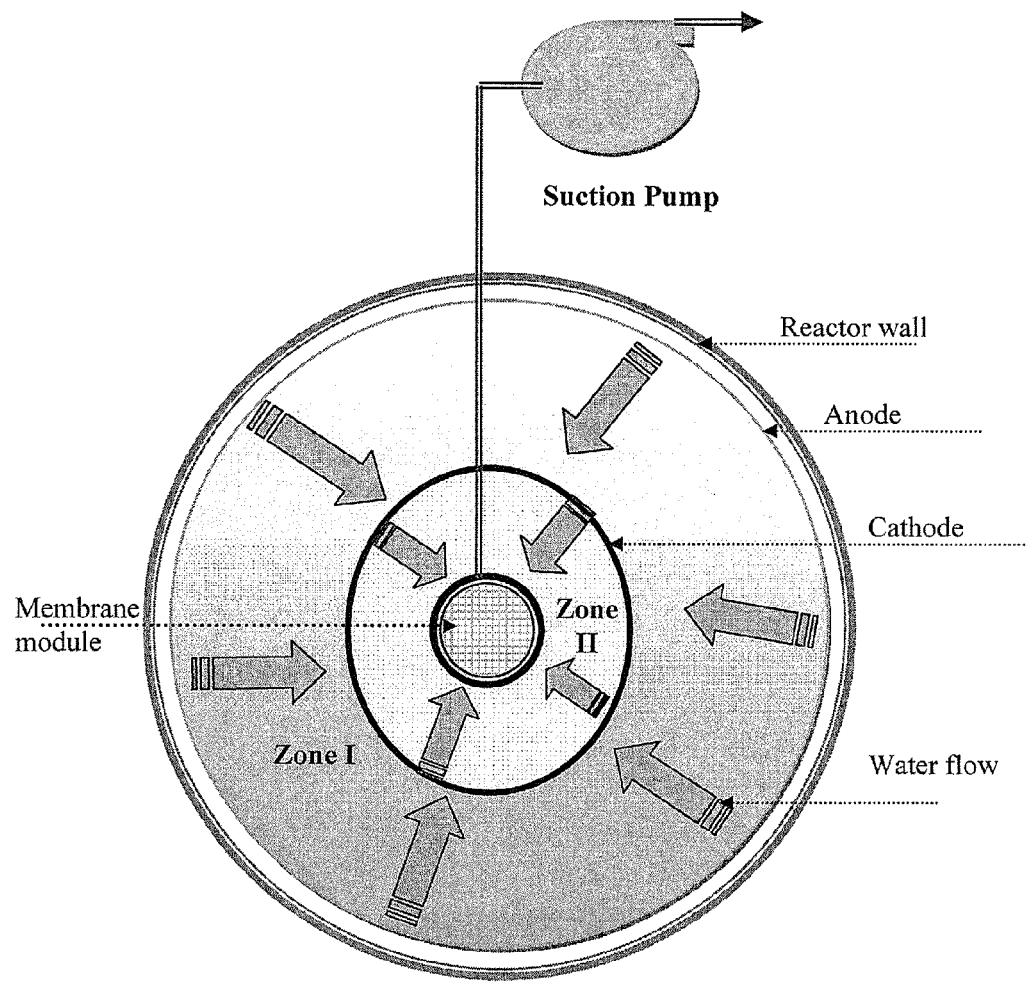
FIG. 6 is a top plan view of fluid flows in the treatment chamber induced by suction from the effluent pump.

As described herein, the SMEBR is governed by the following fluid motions:

i) Supply of wastewater from the outside and across the perforated anode in order to undergo biological and electrochemical treatment between the electrodes.

ii) Air flow from bottom to the top. Air is used in SMEBR systems for three main reasons: i) supplying sufficient oxygen for the microorganism to achieve the biological process, ii) achieving a good mixing of the ML solution in the electro-bioreactor's zones and iii) reducing the fouling rate of the membrane. According to the above explanations, air bubbles are transferred from the bottom toward the top of the reactor.

iii) Electro-formation of flocs and electro-settling. According to the principles of electrokinetic phenomena, a direct current (DC) field is formed between two electrodes: the anode and cathode. At the anode, the electrolysis of the anode material (M) into its cation ($M^{n+}$) and the formation of $H^+$ and $O_2$ takes place under oxidation condition; simultaneously, water is reduced to hydrogen gas and the formation of hydroxyls ($OH^-$) take place at the cathode. Subsequently, flocs are formed in the mixed liquor, which accelerate the settling and the removal of pollutants (organic and inorganic) bonded to solids.

iv) Treated water flows through the perforated cathode toward the membrane module. According to the suction pump connected to the membrane module, the treated water flows from the bulk solution toward the membrane as shown in FIG. 6. This hydraulic kinetic force also drives the particles onto the membrane surface due to the movement of liquids out of the membrane.

Successful design of the SMEBR system should be based on assessing accurate operational parameters that would be able to simultaneously control all the preferential processes: biodegradation, electro-coagulation, electro-degradation, and filtration within the system.

Biodegradation processes are affected by the surrounding environmental conditions (temperature, pH, $O_2$ concentration) in the bioreactor. Applying a DC electrical field onto mixed liquor solution will affect all of these conditions in different ways (e.g., temperature may rise, pH would decrease closed to the anode and increase closed to the cathode). The recommend range for pH for microorganism is within the range 6-9. Subsequently, an interrupted supply of electrical field is needed to preserve the viability of microorganisms. However, at the same time, a DC (at an accurate voltage gradient and current density) is required for an effective electro-coagulation process to create flocs in the bioreactor so the small particles can aggregate and can move away from the membrane module.

On the other hand, the supplied oxygen might also affect the behavior of the microorganisms in the bioreactor; however, an excess of air may breakdown the flocs' formation. Therefore to achieve the overall objectives of the designed configuration, five parameters should be controlled and optimized during the SMEBR operation, those are: Electrical gradient; Exposure time to DC; Air supply; Hydraulic retention time (HRT); and Sludge retention time (SRT).

As the submerged membrane electro-bioreactor system (SMEBR) has been designed for the first time in this work and in order to verify the feasibility of the system for wastewater treatment, it was decided to operate the SMEBR on continuous operation mode to obtain results close to the normal operation conditions in a wastewater treatment plants. Both water quantity and quality were monitored to assess the performance of the SMEBR system under various operating conditions. Water quality analysis was based on the change of physicochemical parameters (pH, temperature) and COD, ammonia nitrogen ($NH_3$—N), nitrate nitrogen ($NO_3$—N), nitrite nitrogen $NO_3$—N) and orthophosphate ($PO_4$—P). The rate and extent of membrane fouling were quantified by measuring permeate flux at constant suction pressure. Changes in the sludge properties within the SMEBR system were based on the following measurements: The MLSS and MLVSS concentrations; Sludge specific resistance to filtration (SRP); and The change in zeta potential of flocs. Based on the measurements of electrical parameters, the changes of the following parameters were calculated: Changes in current density; Electrodes consumption; and Energy consumption.

In Phase I (preliminary phase) of the research relating to SMBER, a comprehensive investigation of the impact of applying direct current (DC) fields on the characteristics of wastewater was studied. The objective of the Phase I was investigating the proper voltage gradient and an operating mode of DC that could be applied to get the best operating conditions for the SMEBR system, where selected electrical parameters would not impede the biological treatment. To simulate a real case, a small electro-bioreactor was used in the Phase I. Based on the obtained results from the Phase I, the best electrical parameters were selected to operate the SMEBR (submerged membrane electro-bioreactor) system in Phases II and III.

In the Phase II, the SMEBR system was under investigation using cylindrical iron mesh as electrodes. The Phase II was performed in sequential two stages: Stage I was considered as a reference stage in which the system was operated without applying DC field, while the Stage II presented the operation of the SMEBR system with DC power supply.

In the Phase III, the perforated cylindrical aluminum sheet was used as anode while the cathode was built with iron mesh (the same one used in the Phase II). The Phase III was performed in sequential four stages. The Stage I was as a reference stage in which the system was operated without applying DC field. In the Stages II and III, the SMEBR system was operated under the same operating conditions. The main difference between the Stage II and the Stage III was in the way of starting operation the SMEBR system. In the Stage IV, a different operating mode of supplying DC was investigated.

Figure 7:
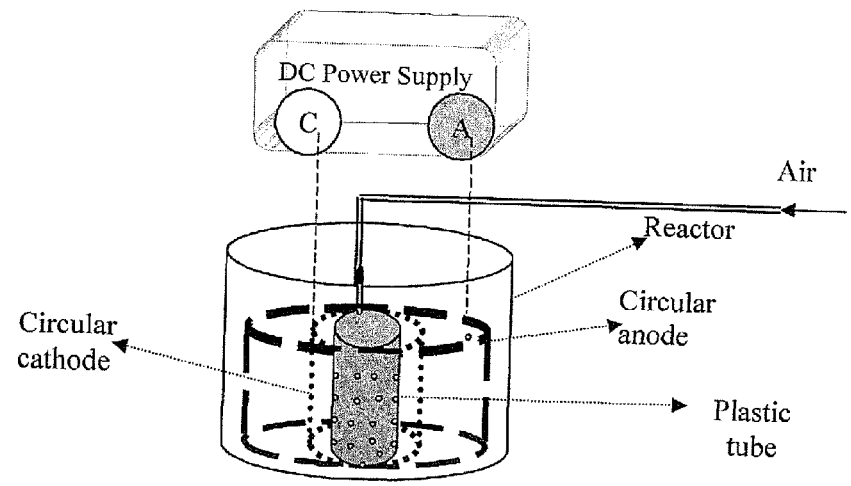
FIG. 7 is a schematic representation of the experimental set up in Phase I.

The experimental set-up of the Phase I is shown in FIG. 7. The setup consisted of a batch cylinder electro-bioreactor of 14 cm inner diameter at the top and 11.2 cm at the bottom and 16.5 cm height. Perforated cylindrical iron meshes were used as electrodes. To simulate the case in the SMEBR system, a perforated plastic tube of 10 mL volume was fixed at the center of the electro-bioreactor. The anode was fixed closed to the internal wall of the electro-bioreactor, while the cathode was fixed around the plastic tube. The distance between the electrodes was 5 cm. The above configurations presented the actual design of the SMEBR system without using membrane module in a smaller scale.

The experimental set up in Phases II and III consisted of the following major units: electro-bioreactor, membrane module, wastewater supply system, aeration system and DC supply system.

Electro-Bioreactor. The electro-bioreactor (EBR) is the main unit in the SMEBR system in which different treatment processes taking place. The electro-bioreactor consisted of the following components:

Plastic Tank. A plastic cylindrical tank (total volume of 20 L, height of 460 mm inside diameter at the top of 284 mm, and at the bottom of 240 mm) was used. The working volume of the tank when all modules were included found to be =13.43 L.

Electrodes. Two cylindrical electrodes (anode (A) and cathode (C)) were used. The anode was made of iron mesh in the Phase II or perforated aluminum sheet in the Phase III while the cathode was made of iron mesh in both Phases II and III. The fixed distance between the electrodes was 5.5 cm in both phases. The iron and aluminum anodes had effective surface area of 93 $cm^2$ and 234 $cm^2$ respectively. The cathode had 106 $cm^2$ effective surface area in both phases.

Membrane Module. A Submerged hollow fiber membrane module (M) which is commercially available under the name ZeeWeed-I by Zenon Environmental Inc., Ontario, Canada was used in this research. The module specifications are summarized in the following table relating to the membrane module used in the experimental work.

| Category | Characteristic |
| --- | --- |
| Membrane type | Hollow fiber membrane (Polyethylene) |
| Total filtering area, [$m^2$] | 0.047 |
| Number of fibers | 80 |
| Length, [cm] | 20 |
| Hollow-fiber membrane pore size, [μm] | 0.04 |
| External diameter, [mm] | 3.4 |

The membrane was fixed vertically in the centre of the electro-bioreactor and it was used to separate treated effluent from the mixed liquor in the electro-bioreactor.

Figure 4:
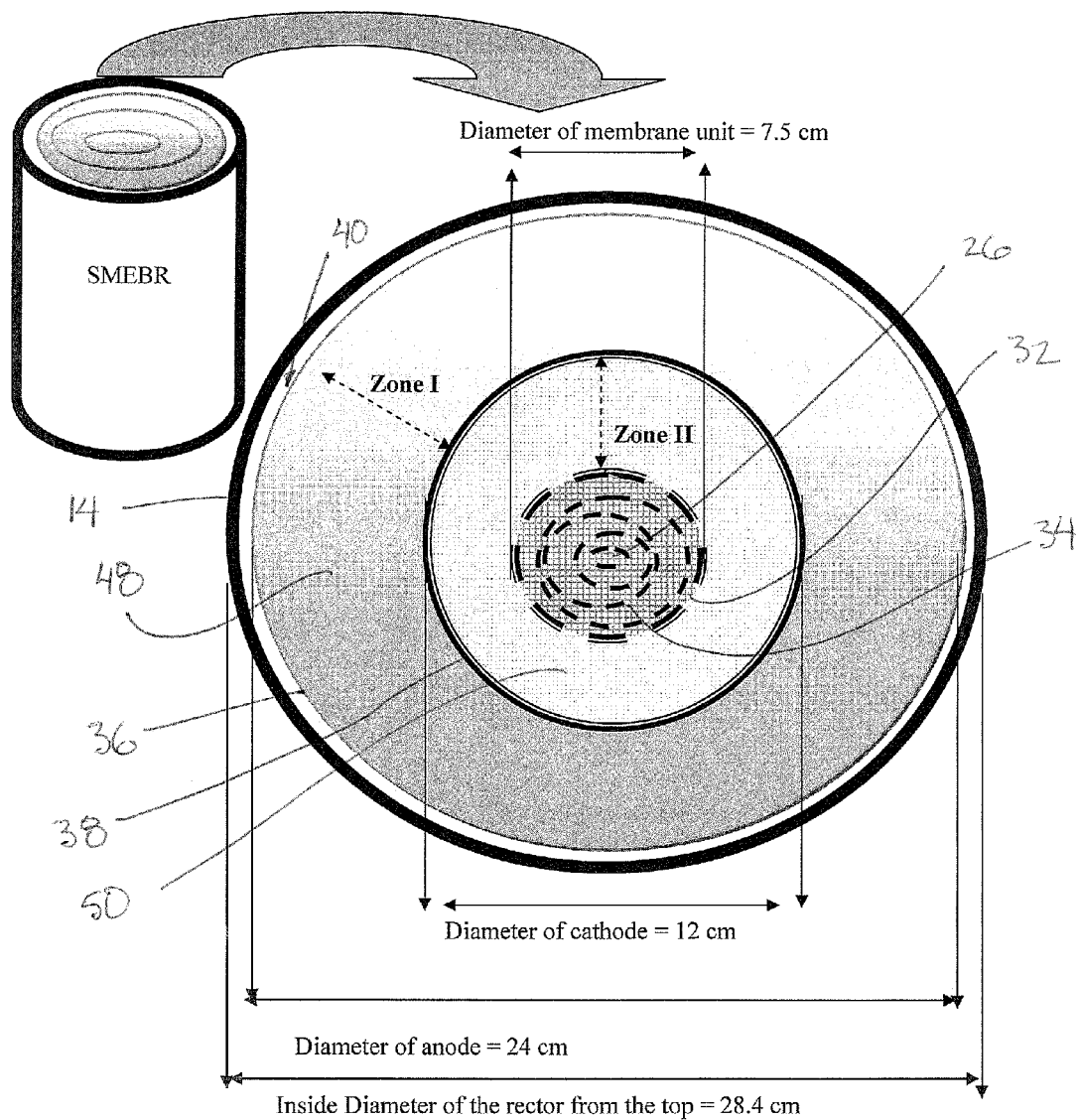
FIG. 4 is a top plan view of the treatment chamber of the wastewater treatment system.
Figure 5:
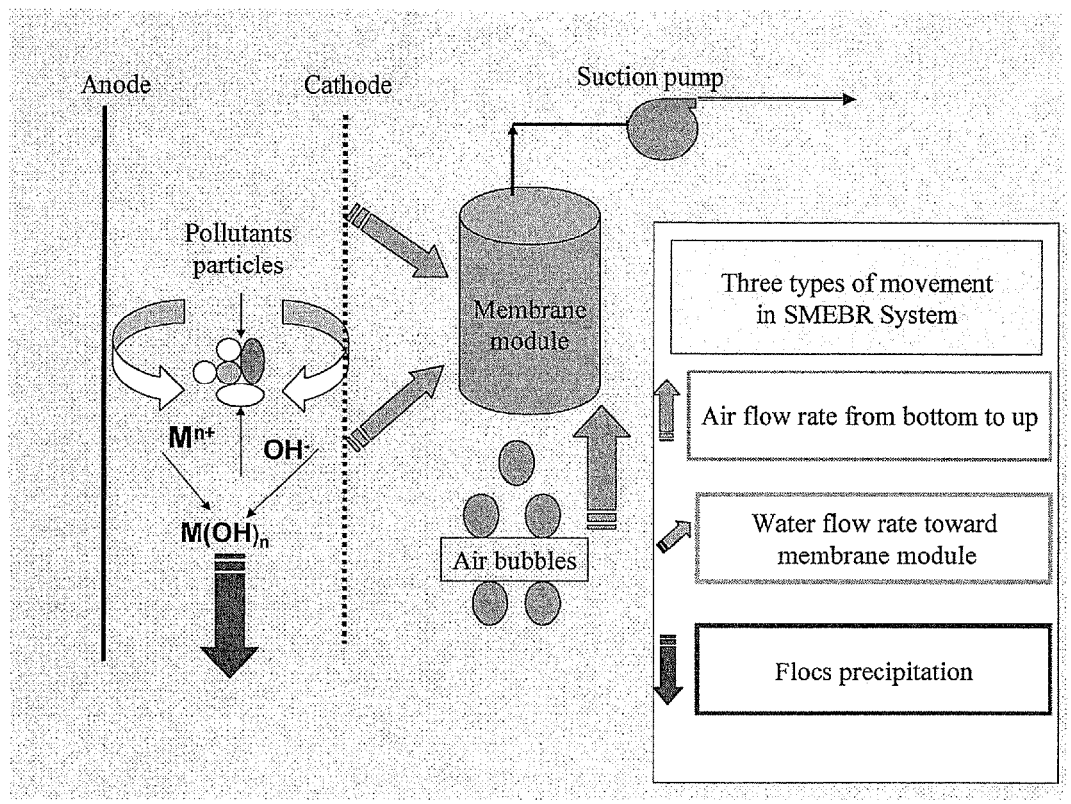
FIG. 5 is a schematic representation of the fluid motions occurring in the wastewater treatment system.

As noted above, the selected design of the SMEBR system divides the electro-bioreactor into two main zones best shown in FIG. 4. The Zone I is boarded between the wall of the electro-reactor to the cathode and the Zone II is boarded from the cathode to the membrane module.

Wastewater Supply System. Tanks. Two tanks were used in the experimental work. The first tank is a feed tank (TI) which was used to storage the prepared wastewater to supply the required feed for the bioreactor, and the second tank (T2) was used for collecting the effluent resulting from membrane filtration process. Both tanks were made of plastic and each tank has a total volume of 20 L.

Pumps. Three (P1, P2, and P3) peristaltic pumps (Model: 13-876-2, Fisher Scientific, Canada) were used during the operation of the submerged membrane electro-bioreactor system. The first one was used as a feeding pump, the second one was used as a suction pump and the third pump was used to withdraw the MLSS solution from the electro-bioreactor for sampling purposes.

Aeration System. The system of aeration in the submerged membrane electro-bioreactor system consisted of three parts: the first part was a porous air diffuser (AD) which was installed just below the membrane module in the bottom center of the electro-bioreactor in the Zone II; the diffuser supplied air continuously with the help of air blower (AB) to maintain the required dissolved oxygen level (>5 mg/L). The supplied air also agitated the sludge and helped in reducing the sludge solids attached to the membrane surface in the Zone II.

The second component of the aeration system was a perforated air tube (AT) which was also used to supply air stream for maintaining the required dissolved oxygen level (>5 mg/L) in the Zone I. The air tube was installed in the Zone I in the middle distance between the anode and the cathode. The supplied air also agitates the sludge in the Zone I.

The third component of the aeration system was a constant air flow rate (3 L/minutes) which was pumped through the membrane module to reduce fouling and cake formation.

DC Supply System. DC Power Supply. Electrodes in the electro-bioreactor were connected to a digital external DC power supply (TES 6230, 0-30 V, 0-3 A). Two digital multi meters were used to measure the current and the applied potential.

Timer. Timer model 5500 (Control Company, USA) was connected with the DC power supply to regulate the operating mode of the applied DC field.

Level Sensor. Level sensor (LS) was connected with the feeding pump to control the level in the electro-bioreactor at the desired level for maintaining a constant volume in the electro-bioreactor.

In this study, synthetic wastewater was used as influent to maintain the consistency of the wastewater compositions during the experimental period. The composition of synthetic wastewater is shown in the following table.

| Compound | Chemical formula | Molecular weight [g/mol] | Concentration Solution [mg/L] |
| --- | --- | --- | --- |
| Glucose | $C_6H_{12}O_6$ | 180.0 | 310 |
| Peptone | — | — | 252 |
| Yeast extract | — | — | 300 |

-continued

| Compound | Chemical formula | Molecular weight [g/mol] | Concentration Solution [mg/L] |
| --- | --- | --- | --- |
| Ammonium sulfate | $(NH_4)_2SO_4$ | 132.1 | 200 |
| Potassium phosphate | $KH_2PO_4$ | 136.1 | 37 |
| Magnesium sulfate | $MgSO_4 \cdot 7H_2O$ | 246.5 | 40 |
| Manganese Sulfate monohydrate | $MnSO_4 \cdot H_2O$ | 169.02 | 4.5 |
| Iron (III) chloride hexahydrate | $FeCl_3 \cdot 6H_2O$ | 270.29 | 0.4 |
| Calcium chloride | $CaCl_2 \cdot 2H_2O$ | 147.0 | 4 |
| Potassium chloride | KCl | 74.55 | 25 |
| Sodium bicarbonate | $NaHCO_3$ | 83 | 25 |

The synthetic substrate was mainly consisting of glucose, peptone, and yeast extract. In addition to that, other chemicals were added to the synthetic wastewater to provide the required inorganic and micronutrients, as well as nitrogen and phosphorous for the development of the biomass growth. The synthetic wastewater was prepared using tap water. About 40 L of synthetic wastewater was prepared once per week. The following table shows the compositions of the biochemical parameters resulted from the preparation of the synthetic wastewater.

| Items | Range |
| --- | --- |
| Average COD, [mg/L] | 280-410 |
| Ammonia-nitrogen, [mg/L] | 25-55 |
| Nitrate, [mg/L] | <0.05 |
| Nitrite, [mg/L] | <0.05 |
| Phosphorus, [mg/L] | 19-31 |

The fill-and-draw technique was used to cultivate the activated sludge. Activated sludge mixed liquor supplied to this purpose was sampled from secondary clarifier in the municipal wastewater treatment plant, in Saint-Hyacinthe (QC, Canada). The initial properties are listed in the following table relating to properties of activated sludge mixed liquor samples used to acclimatize experimental wastewater.

| Items | Range |
| --- | --- |
| MLSS, [mg/L] | 3400 |
| pH | 6.78-7.78 |
| Zeta Potential, [mV] | −32.2 |
| Oxidation-Reduction-Potential, ORP, [mV] | 6-8 |
| Supernatant COD, [mg/L] | 85 |
| Supernatant ammonia-nitrogen, [mg/Li | 25 |
| Supernatant nitrate, [mg/L] | <0.05 |
| Supernatant nitrite, [mg/L] | not detected |
| Supernatant phosphorus, [mg/L] | 47.2 |

Figure 2:
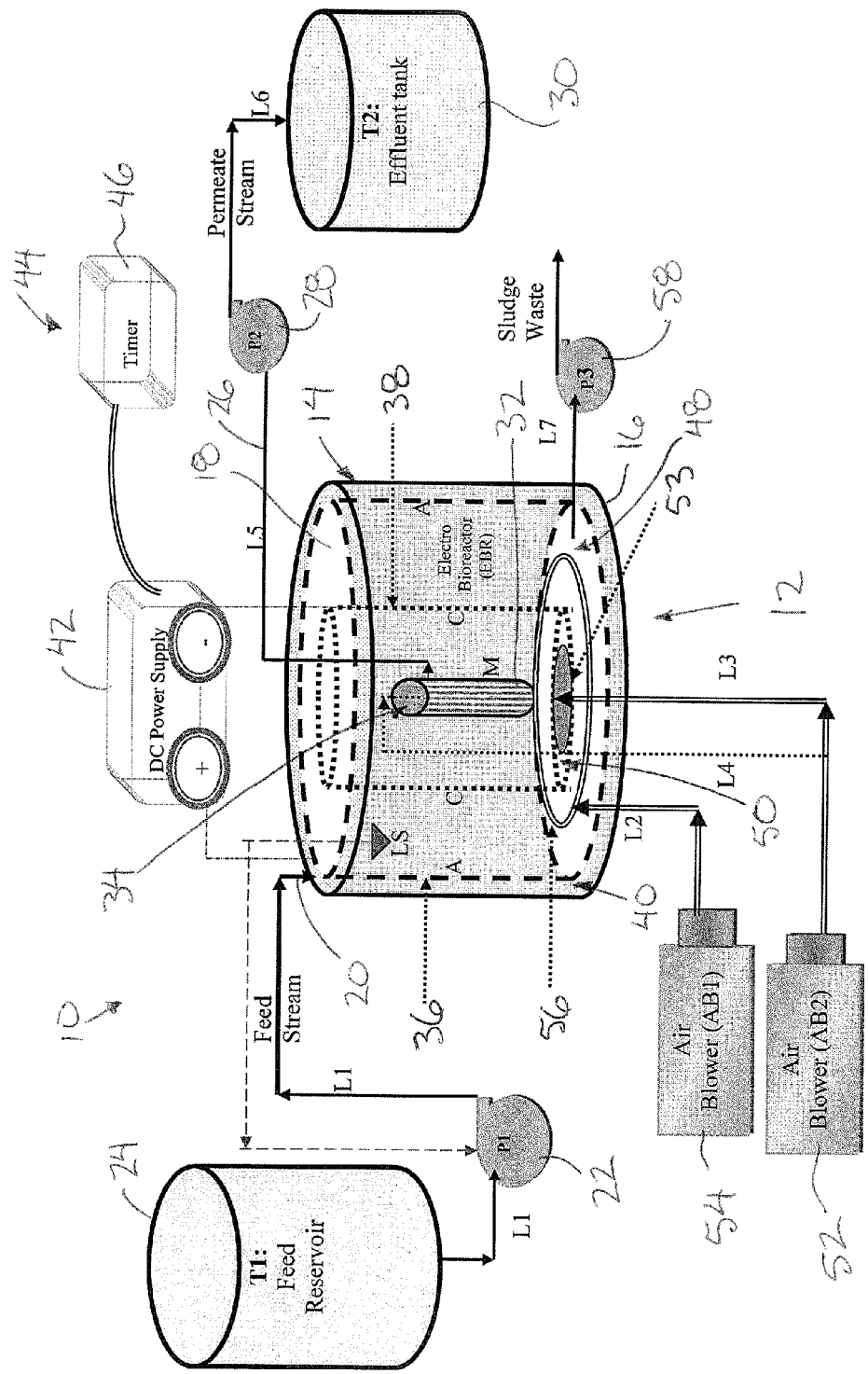
FIG. 2 is a schematic representation of a submerged membrane electrobioreactor wastewater treatment system according to the present invention.

Referring to FIG. 2 after preparing the synthetic wastewater, the wastewater was stored in feed tank (TI) and was pumped through line (LI) via peristaltic pump (PI) to the electro-bioreactor (EBR). Supplying of wastewater from the feed tank was across the anode (A) toward the Zone I.

Inside the electro-bioreactor; and throughout the Zone I, two wastewater treatment processes should be done: biological and electrochemical treatment. In the Zone II, membrane filtration process took place to separate liquid from solid.

Air stream was supplied to the electro-bioreactor through line (L2) via air blower (AB1) and through line (L3) via air blower (AB2).

The air stream from line (L2) was used to supply air to the Zone I in the electro-bioreactor through the aeration tube (AT) while the air stream from line (L3) was used to supply air to the Zone II in the electro-bioreactor through the air diffuser (AD) which was fixed directly under the membrane module (M). Air bubbles will transfer from the bottom toward the top of the reactor. The third stream of air (L4) was pumped thought the top of membrane module as described by the manufacture to help in reducing fouling on the membrane module (M).

The treated water was withdrawn thorough line (L5) via peristaltic pump (P2) and thought line (L6) to permeate tank (T2).

For sampling purposes, the mixed liquor solution was withdrawn from the electro-bioreactor's zones thorough line (L7) via pump peristaltic (P4).

The DC power supply was used to supply the required voltage for the process through connection DC Power supply with the immersed electrodes (anode (A) and cathode (C)) in the electro-bioreactor. The DC power supply was connected with timer to regulate the exposure time of DC field.

All the description of sampling methodology described in the following is related to Phases II and III of this research.

To monitor the SMEBR system performance, samples from the influent, bioreactor's zones and the effluent were taken regularly on a daily base during the periods of operation to analyze for specific parameters. Influent and effluent samples were taken as grab samples at the same time as the MLSS solution form the electro-bioreactor's zones.

Influent samples were filtrated before analysis to remove any suspended solid materials. Effluent samples were analyzed without any pre-treatment. Samples from the bioreactor's zones were filtrated with 0.45 mm filter paper. The deposit solids on the paper were used for the MLSS and the MLVSS measurements and the filtrate was taken for measuring organic and nutrients parameters in the supernatant.

One sample (50 mL) from the mixed liquor was taken daily from each zone in the electro-bioreactor and the supernatant was taken for zeta measurement after settling the mixed liquor for 30 minutes. To decrease the amount of sludge losing from the electro-bioreactor, the sample was returned back to the electro-bioreactor after taking the measurement.

About 100 mL were sampled form each zone of the elector-bioreactor for the specific resistance to filtration (SRF) tests. In order to minimize in the waste sludge from the electro-reactor in Phases II and III, the SRF tests were determined every 10 days during the operation process of each phase.

To measure the oxygen uptake rates (OUR) in the Phases II and III, about 250 were sampled form each zone and the samples were returned back immediately to the elector-bioreactor's zones after finishing the OUR measurements. The value of the OUR was used to calculate the specific oxygen uptake rate (SOUR). The OUR tests were determined every 2 days during the operation process of each phase.

Different physiochemical and biochemical parameters were analyzed in this research to assess the performance of the SMEBR system.

The following now relates to Phase III of the experimental work. It highlights the overall performance of the SMEBR system when a perforated cylindrical aluminum sheet was used as the anode while the cathode was made of a perforated cylindrical iron mesh (the same one used during Phase II). The operational period of this phase was divided into four sequential stages and extended for 66 days as follows:

i) The Stage I lasted 33 days without the input of DC (reference stage);

ii) The objective of the Stage II, which extended for 7 days, was to investigate the performance of the SMEBR system when the DC is applied to the MLSS solution in conjunction with the operation of the membrane module. The mode 15 minutes ON/45 minutes OFF was used during the DC supply.

iii) The Stage III continued for 17 days after washing the membrane to recover its permeability. The mode of operation of the DC was the same as in Stage II.

iv) The Stage IV lasted for 9 days and the SMEBR system was operated with 15 ON/105 OFF as a new mode of DC supply. The output results from the Phase III showed that operating the SMEBR system with aluminum as an anode enhanced the membrane permeability up to 37% on average for the mode of operation with 15 minutes ON/45 minutes OFF and 62% for the mode of operation 15 minutes ON/105 minutes OFF indicating that operational mode of DC supply is a key parameter in the SMEBR system. Furthermore, the results showed that a better performance of the SMEBR system can be achieved if the DC field is applied into the mixed liquor solution before immersing the membrane module into the electro-bioreactor. The electro-bioreactor needs a few minutes to establish coagulation process within the mixed liquor solution.

Furthermore, the SMEBR system did significantly improve the removal of COD and phosphorus. The overall removal efficiency for COD was greater than 96% and greater than 98% for phosphorus. In conjunction, the removal of $NH_3$—N was 70%.

Turning now to the theory of EC process with aluminum anode, generally, the overall efficiency of the EC process depends on several operating parameters (conductivity, pH, particle size, concentration of pollutants). The complex nature of the electro-coagulation process is summarized in noting that when aluminum is used as the anode, the main reactions are as follows:

At the anode:

$$Al \rightarrow Al^{3+} + 3e^- \qquad (1)$$

At the cathode:

$$3H_2O + 3e^- \rightarrow 3/2H_2(g) + 3OH^- \qquad (2)$$

An the solution:

$$Al^{3+}(aq) + 3H_2O \rightarrow Al(OH)_3 + 3H^+(aq) \qquad (3)$$

The amorphous $Al(OH)_3(s)$ formed is characterized by "sweep flocs" that have large surface areas which are beneficial for the rapid adsorption of soluble organic compounds and entrapping colloidal particles. These flocs are removed easily from aqueous medium by sedimentation.

In Phase III of this research, the SMEBR was operated for 66 days. In this phase, a perforated cylindrical aluminum sheet was used as an anode while the cathode was produced with perforated cylindrical iron mesh (the same one used in Phase II). The cathode was washed with tape water and immersed in diluted nitric acid solution (Concentration=1 N) for 8 h to remove any debris material before Phase II. The cathode was then washed with tape water for 30 minutes before it was utilized in Phase III.

Constant level in the electro-bioreactor was maintained by monitoring sensor that controlled the feed pump. The SMEBR system was operated under continuous aeration to achieve organic pollutants removal and nitrification process. Dissolved oxygen concentrations were maintained between 5 and 8 mg/L in the electro-bioreactor's zones.

The process was closely monitored for various parameters including the physical/chemical parameters: pH, temperature, MLSS, MLVSS, specific resistance to filtration (SRF'), and zeta potential, as well as COD, ammonia nitrogen ($NH_3$—N), nitrate nitrogen ($NO_3$—N), nitrite nitrogen $NO_2$—N) and orthophosphate ($PO_4$—P).

Phase III was divided into four stages: Stage I, which was considered the reference stage for comparison purposes, was extended for 33 days without input of DC. Studying the effect of DC on the physiochemical and biochemical properties on the MLSS solution could be achieved from the initial operation of the SMEBR system, but the main objective of extending this stage for 33 days was to give the ammonia nitrification bacteria a sufficient time to replicate, because nitrification bacteria require more time to establish themselves and to reach sufficient concentrations to nitrify the ammonium. It has been previously reported that the growth rate of ammonia nitrifying bacteria is the single most important factor in achieving high rates of nitrification.

The impact of applying a DC field in the SMEBR performance was studied in three sequential stages starting from Stage II. The objective of Stage II was to investigate the performance of the SMEBR system when a DC is applied to the MLSS solution in conjunction with the operation of the membrane module. The duration of Stage II was 7 days and the operating mode of the DC power supply was 15 minutes ON 145 minutes OFF.

Stage III extended for 17 days and the operational mode of the DC power supply was the same as that in the Stage II. Stage IV lasted 9 days during which time a new mode of operation in terms of applying the DC was investigated. The following Table shows the different conditions under which the process was run and monitored during Phase III.

| Items | Stage I | Stage II | Stage III | Stage IV |
|---|---|---|---|---|
| Operation time (days) | 33 | 7 | 17 | 9 |
| SRT (days) | ~200 | ~200 | ~200 | ~200 |
| DO in bioreactor (mg/L) | 5-8 | 5-8 | 5-8 | 5-8 |
| DC (V/cm) | 0 | 1 | 1 | 1 |
| DC exposure time (minutes) | 0 | 15 ON/ 45 OFF | 15 ON/ 45 OFF | 15 ON/ 105 OFF |
| Influent temperature (° C.) | 19-21 | 19-21 | 19-21 | 19-21 |

During the whole operational period, no sludge was withdrawn from the electro-bioreactor, except for the purposes of analysis of the samples (conventional parameters analysis and SRF tests). Given these conditions, the SMEBR system can be considered to operate under the complete retention of the sludge. This assumption was also assumed when the samples withdrawn from a reactor is used exclusively for sampling analysis. However, on average, about 350 mL/week of sludge volume was removed and not returned to the electro-bioreactor, corresponding to average sludge retention time (SRT) of 200 days.

In order to study the fouling degree accurately, the process was operated with a constant transmembrane pressure; this meant that the permeate flux decreased with time because of the fouling phenomenon. Moreover, no back washing for the membrane module was performed during the operation. The surface of membrane module was washed with distilled water outside the electro-bioreactor for few minutes each time the permeate flux rate declined significantly in order to recover the membrane permeability. Furthermore, a constant air flow was also injected in proximity of the membrane module to reduce fouling and cake formation.

To study the performance of the SMEBR system in the electro-bioreactor's zones, the analyses of physiochemical and biochemical parameters of the mixed liquor solution in the electro-bioreactor were based on samples taken from both zones of the electro-bioreactor. For the MLSS and MLVSS concentrations in the electro-bioreactor, these values were taken as the average concentrations in electro-bioreactor's zones.

The influent and the effluent were sampled daily and analyzed for total COD, ammonia nitrogen ($NH_3$—N), nitrate nitrogen ($NO_3$—N), nitrite nitrogen ($NO_2$—N) and orthophosphate ($PO_4$—P). Biomass samples were withdrawn from the electro-bioreactor daily and analyzed for MLSS and MLVSS according to Standard Methods.

The COD concentration was determined using UV-Vis spectrophotometer instrument. Ammonia nitrogen ($NH_3$—N), nitrate nitrogen ($NO_3$—N), nitrite nitrogen ($NO_2$—N) and orthophosphate (PO4—P) concentrations were analyzed using Hach Digestion Vials.

The dissolved oxygen (DO) concentration was measured using the DO meter (YSI, Model 52, USA). The values of pH and temperature were measured using a pH meter model 215 (Denver Instrument, USA). Calibration of the pH and DO meters were conducted daily and a room temperature (20±1° C.) was set as the default temperature.

The zeta potential of sludge flocs was determined using a zeta meter analyzer (Zeta Meter 3.0+, USA). One sample (50 mL) from the mixed liquor was taken daily from each zone in the elector-bioreactor and its supernatant was taken for zeta measurement after settling the mixed liquor for 30 minutes. To decrease the amount of sludge loss from the elector-bioreactor, the sample was returned to the electro-bioreactor after taking the measurement.

The specific resistance to filtration (SRF) was determined. Approximately 100 mL was required for SRF measurements. In order to minimize the waste sludge from the electro-bioreactor, the specific resistance to filtration test was measured every 10 days during the entire operational process.

The specific oxygen uptake rate (SOUR) of the activated sludge was determined in each zone in order to know the effect of applying a DC field on microbial activity. The specific oxygen uptake rate was calculated which required determining the oxygen uptake rate (OUR).

The oxygen uptake rates were determined immediately after samples (about 250 mL per sample) were taken from the elector-bioreactor. The OUR was measured by using a YSI DO meter, Model 52 and a DO probe inserted into the sample bottle, which was tightly sealed to prevent oxygen transfer from the outside. The decrease in DO concentration with respect to time was recorded and the slope of the concentration versus time plot gave the oxygen uptake rate.

Figure 8:
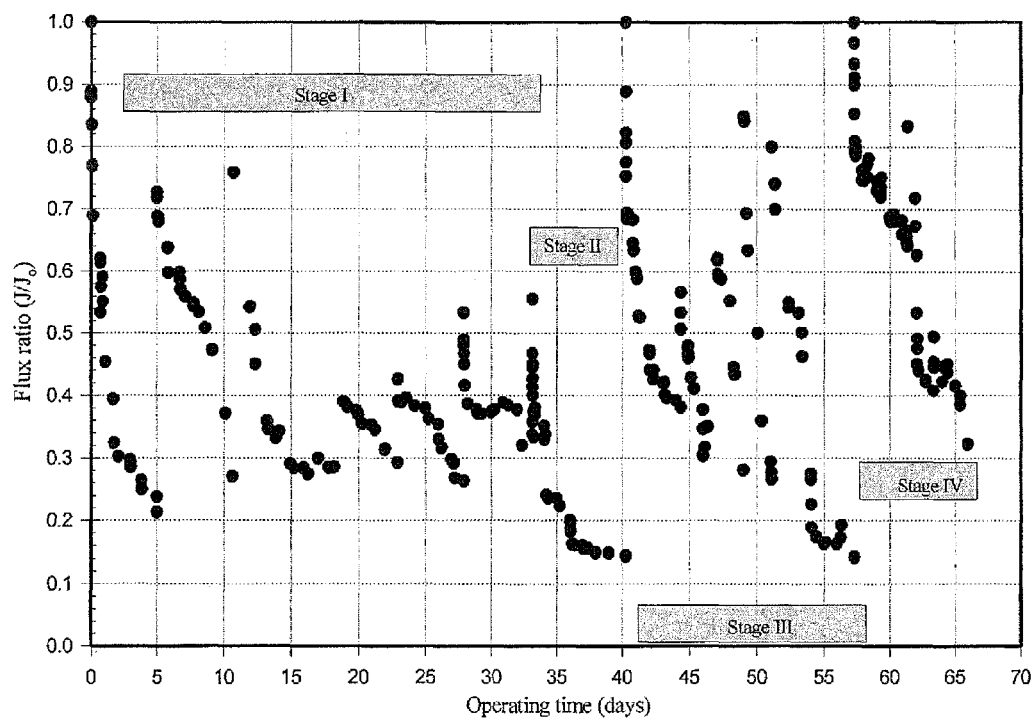
FIG. 8 is a graphical representation of the change of permeate flux with time in the SMEBR system during Phase III.
Figure 9:
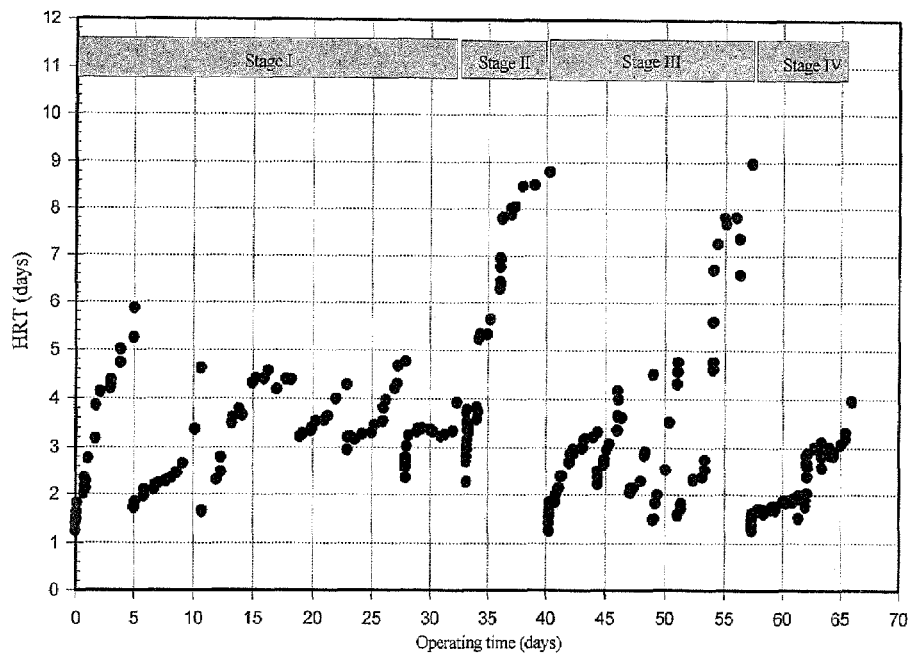
FIG. 9 is a graphical representation of the change of the HRT in the SMEBR system during Phase III.

Since the SMEBR system was operated under a mode of constant transmembrane pressure, the decreased permeate flux (J) defined fouling rate with time. FIG. 8 shows the ratio of permeate flux to initial water flux ($J/J_i$) during the period of membrane filtration of sludge suspension in the SMEBR system. Alternately, FIG. 9 illustrates the corresponding percent reduction in permeate flux (PRPF) calculated from the following equation:

$$PRPF = \left(1 - \frac{J}{J_i}\right) \times 100\% \qquad (4)$$

Where $J_i$ is the initial permeate flux and $J_i$ is the permeate flux at any time during Phase III.

Figure 10:
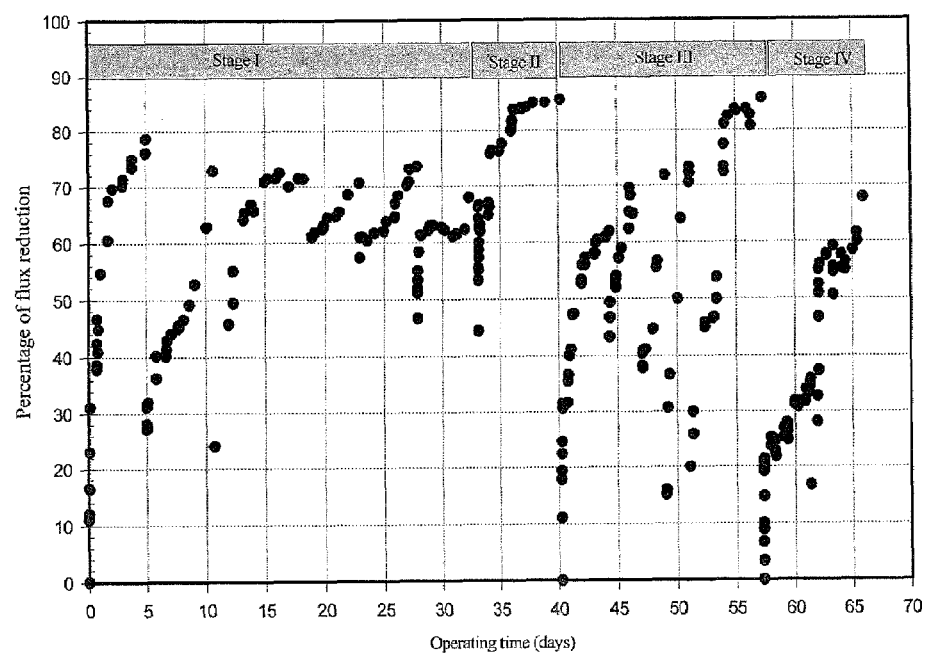
FIG. 10 is a graphical representation of the change of the percentage reduction in permeate flux in the SMEBR system during Phase III.

Furthermore, the hydraulic retention time (HRT) increased with time as a result of declined flux as shown in FIG. 10. To assess the fouling behavior in the SMEBR system during the operational period of Phase III, the curves of FIGS. 8, 9 and 10 are divided into four stages: Stage 1: from day 1 to day 33; Stage II: from day 33 to day 40; Stage III:, from day 40 to day 57; and Stage IV: from day 57 to day 66. During Stage I, with no input of DC power, the permeate flux dramatically decreased in this first operation (FIG. 8) which was expected due to fouling phenomenon.

After 5 days of operation of Stage I, the PRPF was 80%. To enhance membrane permeability, the membrane was washed with distilled water for few minutes outside of the reactor when the ($J/J_i$) ratio reached between 0.2 and 0.3. The washing events during Stage I appear on the FIG. 8 as peaks in the filtration performance curve on days 5, 11, 19, 23 and 28.

The objective of Stage II in Phase III was to investigate the performance of the SMEBR system when the DC is applied to the MLSS solution in conjunction with the operation of the membrane module. At the end of Stage II, the membrane was removed for physical cleaning by distillate water for few minutes outside the electro-bioreactor, and subsequently immersed in the electro-bioreactor. The HRT at the beginning of Stage II was 3.5 days as shown in FIG. 9. In Stage II behaviour, immediately after applying a DC field of 1 V/cm with a mode of operation of 15 ON/45 OFF (selected based on the optimum results from the previous experiments of Phase I,), the flux declined faster than in Stage I. The PRPF was 85% after 5 days of operation and reached 87% at the end of Stage II. This behavior could be attributed to two hypothesis: i) the washing by physical cleaning before operating Stage II was not sufficient to remove all the particles that deposited within the membrane pores; ii) the electro-coagulation process did not have enough time to form aggregates in the solution, which could reflect directly on the membrane filtration process. In other words, when the membrane filtration process operates simultaneously with the DC field in the SMEBR system, the finely dispersed particles present in the electro-bioreactor have the potential to go through the membrane's pores and build-up the fouling resistance. Consequently, the optimum performance of the SMEBR system in terms of membrane filtration would be better if the SMEBR system was operating for a few minutes without immersing the membrane module in the electro-bioreactor. This result supports the conclusion derived from Stage II of Phase II, where the optimum performance of the SMEBR system can be achieved when the effect of electro-coagulation can be generated prior to the immersion of the membrane module in the electro-bioreactor.

Accordingly, the physical and chemical washing of membrane was done before the beginning of Stage II; the membrane module was removed from the reactor and immersed in tap water for 2 hours, and subsequently in 5% NaOCl solution for 8 hours. It was finally rinsed with tap water. This procedure enabled to re-establish most of the membrane's permeability.

To prepare the MLSS solution for coagulation, the SMEBR system was operated with the DC field but without membrane module during the first hours of the Stage III; subsequently, the membrane module was immersed in the electro-bioreactor. At this stage, the influence of the electro-coagulation process is clearly reflected in the membrane filtration process, since the permeate flux declined much lower than observed in Stages I and II. During Stage II, the ratio ($J/J_i$) stabilized at around 0.37 during the first 5 days of operation and corresponded to a 63% reduction in membrane flux.

Figure 11:
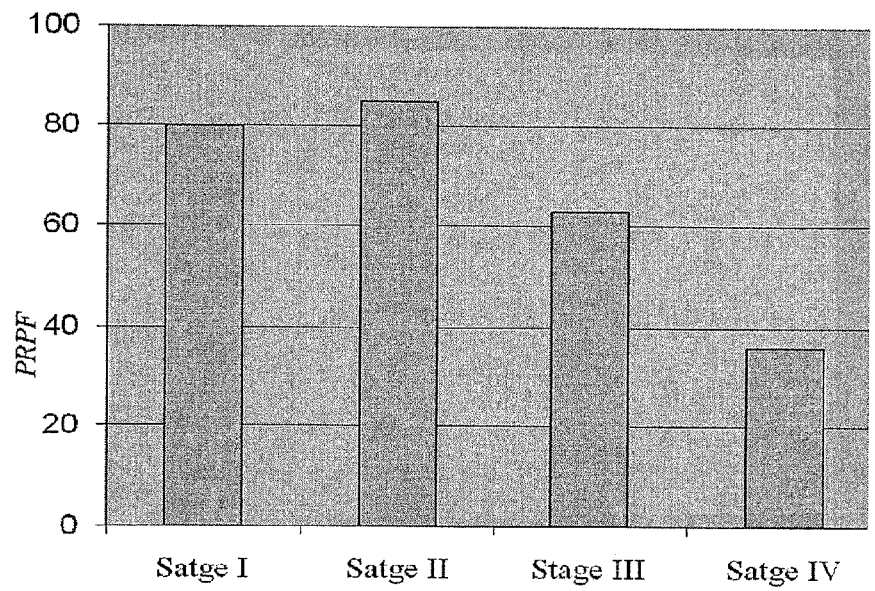
FIG. 11 is a graphical representation of the percentage reduction in membrane flux in the SMEBR system after five days operation of each stage during Phase III.

In Stage IV, the mode of operation of the DC was modified to 15 minutes ON/105 minutes OFF. The results from this stage showed much improvements; the PRPF was only 38% after 6 days of the continuous operation without any kind of backwashing of the membrane module. By comparing the first five days of operation of each stage, the SMEBR system performed best during Stage IV in term of membrane filtration when compared with any other stage, as illustrated in FIG. 11.

At the end of the Stage IV, the PRPF was 68%. A permanent failure in the level switch occurred on the day 66 forced the termination of Phase III.

The change in the HRT during the operation is another indicator of the SMEBR performance. FIG. 9 shows how the rapid HRT fluctuation in Stage I was due to the rapid decline of the permeate flux. The HRT increased from 1.2 day (at the beginning of the operation) and reached 6 days after five days of operation during Stage I. Throughout the time remaining, the HRT did not exceed 5 days, reflecting a steady performance of membrane filtration. This suggests that the resistance to pore blocking reached a stable condition.

The worst performance of membrane filtration during Stage II (FIG. 8) was associated with an increase in the HRT (FIG. 9). The value of HRT increased from 3.5 days at the begging of Stage II to 58.7 days at the end.

The excellent performance of membrane filtration during Stage IV was reflected in the HRT values. At the beginning of Stage IV (day 57), the HRT was 1.3 day and increased to 2 days after five days of continuous operation (day 63 of Phase III). After repairing the damaged level switch, the HRT increased from 1.5 day to 4 days by the end of Stage IV.

Measuring the pH in the mixed liquor after introducing a DC field in the activated sludge is an important parameter for the study of the impact of applying a DC on bacterial growth. Specifically, the optimum range of bacterial growth in terms of pH is closed to neutrality with limits in minimum and maximum range near 5 and 9 respectively.

In Phase III, the pH values were measured daily. The variations of the pH values in the influent, the MLSS solution in electro-bioreactor's zones and the membrane effluent are presented in FIG. 12.

Figure 13:
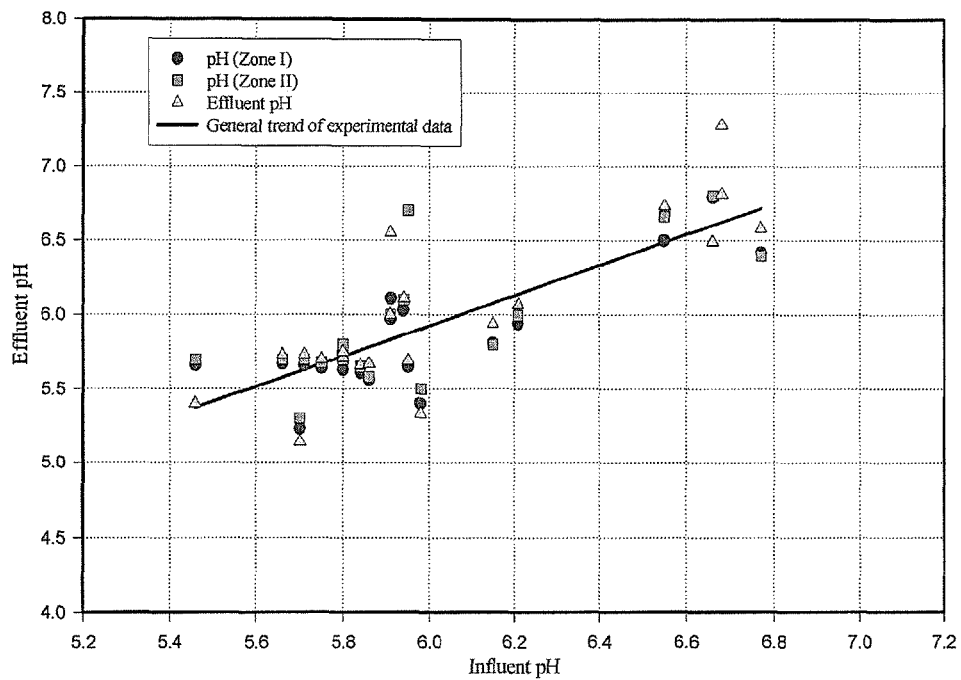
FIG. 13 is a graphical representation of the change in pH values in the SMEBR system with influent pH during Stage I of Phase III.

The drops in the pH during the first stage of operation had a negative impact on the MLSS concentrations as well as on the nitrification process. It was observed that the influent pH affected significantly the pH values in the SMEBR system. A relationship between the pH of the influent and the pH values in the SMEBR system during Stage I is presented in FIG. 13.

Figure 12:
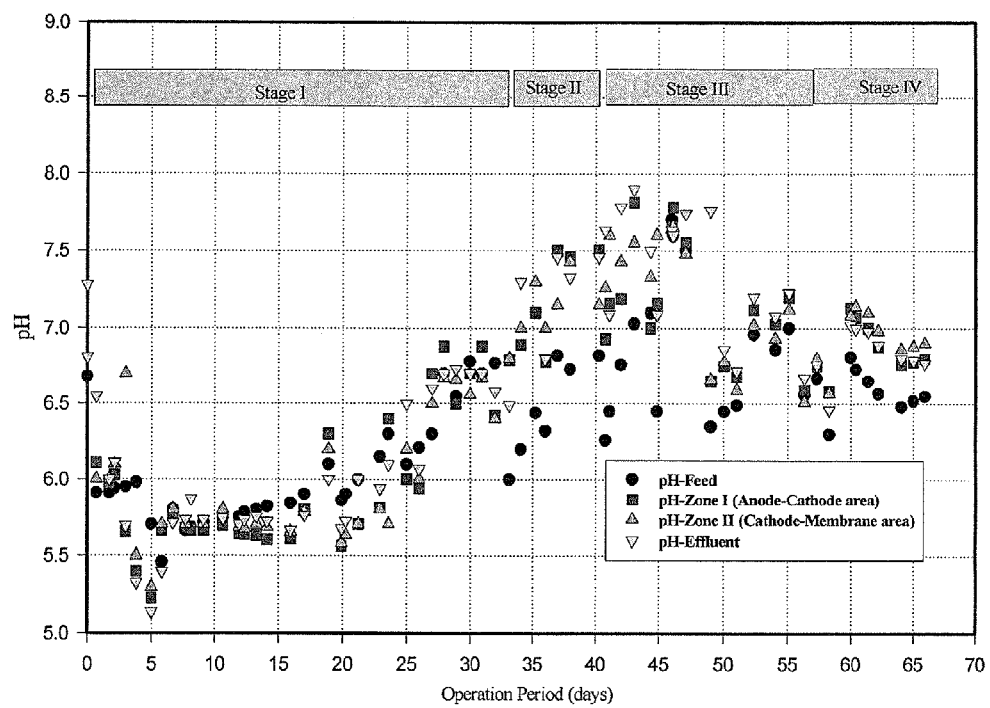
FIG. 12 is a graphical representation of the change in the pH values in the SMEBR system with time during Phase III.

FIG. 12 shows that changes in the pH after applying the DC field, began to appear on day 33 (at the beginning of the Stage II) when the pH of the MLSS solutions increased as a result of the electrokinetic phenomenon. The increase in the pH solution after applying DC field into wastewater was also observed by other investigators and it was attributed to production of hydroxyls at the cathodes.

During the application of the DC field, the changes in the pH of the effluent were within the range of 6.0 to 7.9, where the average value did not exceed a pH of 6.8. This signifies that the effluent of the SMEBR system does not need further adjustment for pH. The same result was obtained in Phase II. Moreover, the color of MLSS solution in Phase III did not change during the time of operation and was found to be the same color as the original MLSS solution; this phenomenon was not observed with the iron material as the anode applied during Phase II. Also, in Phase III, water permeate quality had neither color nor odor.

Furthermore, starting from day 33, a difference in the pH values appeared between the MLSS solution located in the Zone I and the other located in Zone II.

Figure 14:
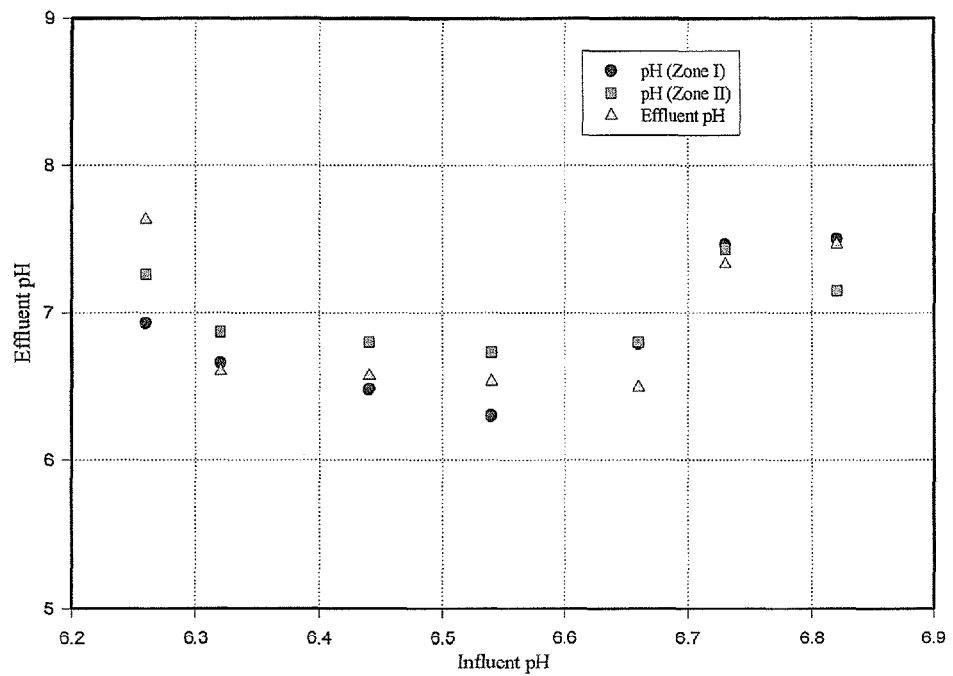
FIG. 14 is a graphical representation of the change in pH values in the SMEBR system with influent pH during Stage II of Phase III.
Figure 15:
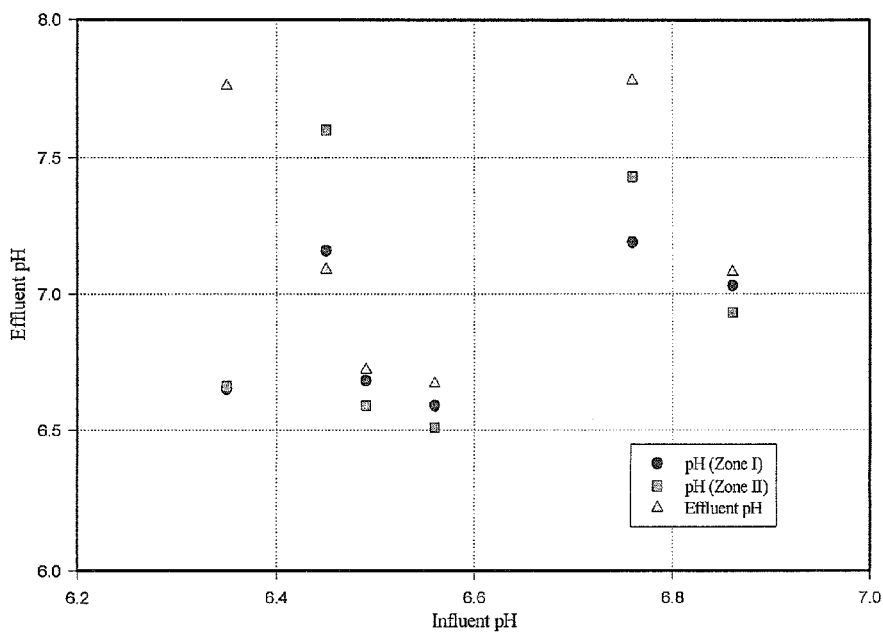
FIG. 15 is a graphical representation of the change in pH values in the SMEBR system with influent pH during Stage III of Phase III.
Figure 16:
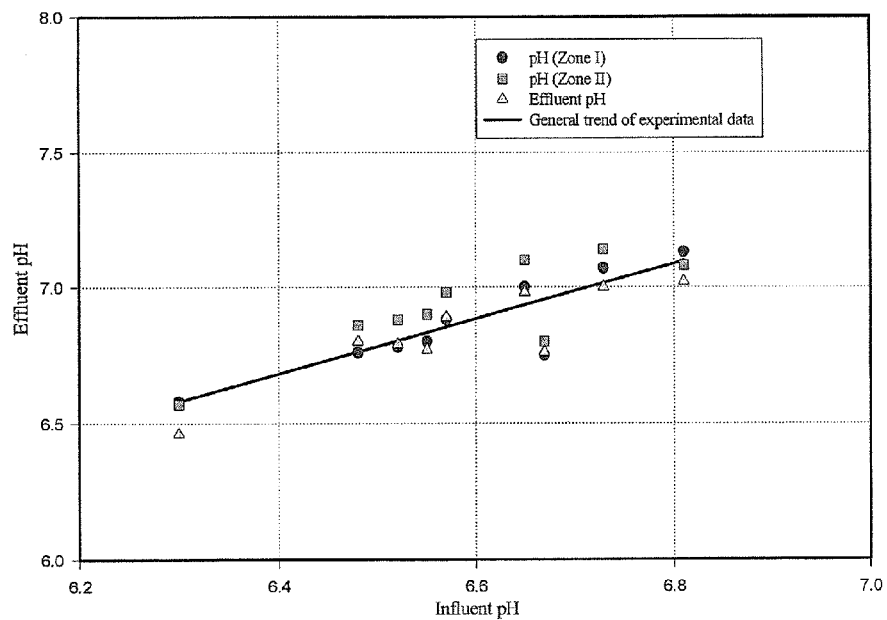
FIG. 16 is a graphical representation of the change in pH values in the SMEBR system with influent pH during Stage IV of Phase III.
Figure 17:
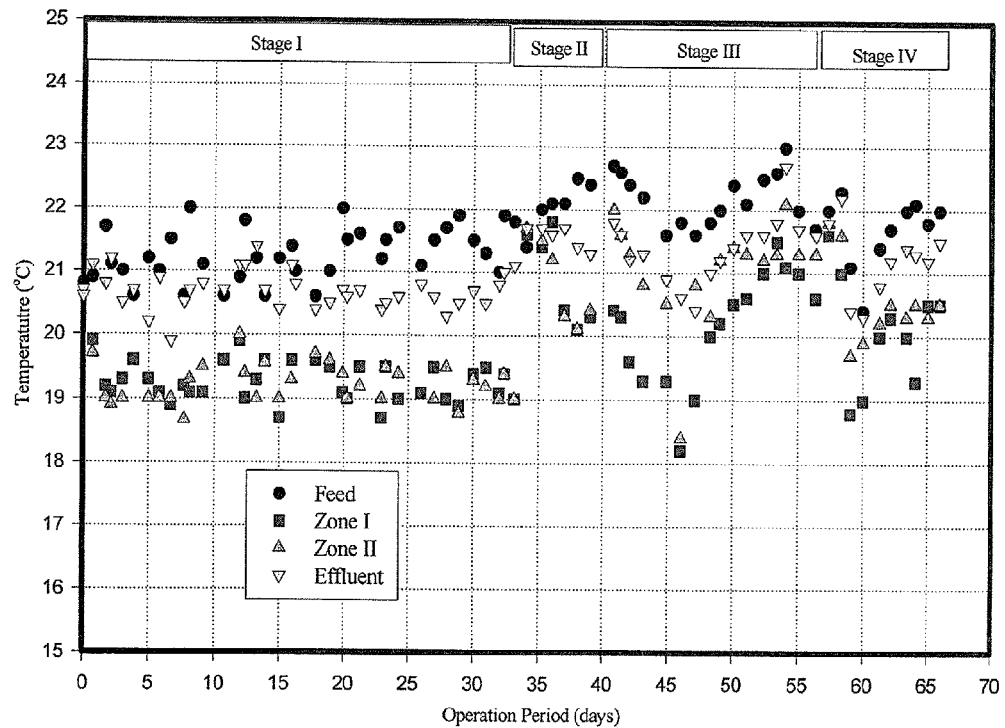
FIG. 17 is a graphical representation of the change in temperature with time in the SMEBR system in Phase III.

It has been established that the influent pH is an important operating factor influencing the performance of electro-coagulation process and the SMEBR system. In Phase III, the influent pH was varied between the range 5.4-7.0 during the operational period. The effluent pH was strongly dependent on the influent pH when the DC was turned off in Stage I. However, this dependence showed a different trend after applying the DC filed throughout Stages II, III and IV, as shown in FIGS. 14, 15 and 16 respectively.

During Stages II and III, the change in pH values in the SMEBR system demonstrated no systematic trend with the influent pH, while in Stage IV, a liner trend was observed between the influent pH and the changes in the pH values in the SMEBR system. A reasonable explanation for this behavior may be due to the effect of the DC operating mode, which reflects the exposure time of the mixed liquor solution to the DC field. In Stages II and II, the operating mode was 15 minutes ON/45 minutes OFF which is equivalent to an effective operational time for electro-coagulation of 33%; while in Stage IV, the operating mode was 15 minutes ON/105 minutes OFF which is equivalent to an effective operational time for electro-coagulation of 14%. This implies that when the electro-coagulation time is high, the effects of the electrokinetic processes on the MLSS solution will be greater and the SMEBR operation will be close to the EC process; however, when the electro-coagulation time is diminished, the SMEBR system operation will be similar to the conventional operation of a submerged membrane bioreactor in addition to benefiting from electrokinetic phenomenon to create coagulation. In other words, it is not necessary to operate the SMEBR system with an extended electro-coagulation time to get the best results. This indicates the importance of the exposure time to DC fields as the key parameter in the SMEBR operation and suggests that there is an optimum condition for the operational mode.

The above analysis appears to indicate that the designed of a SMEBR system can operate in two different modes. The first mode is the normal operation of the conventional submerged membrane bioreactors when the DC power supply is turned off. In this mode, biodegradation as a wastewater treatment process dominates and the pH values of the mixed liquor solution in the bioreactor as well the pH of the effluent is affected by the influent pH.

On the other hand, the mode where the DC power supply is turned on, the electrokinetic processes are dominant and the pH values of the SMEBR system will be less dependent on the influent pH as the electro-coagulation process acts as a pH buffer.

The variations in temperatures of the influent, the MLSS solutions and the membrane effluent are presented in FIG. 16. The temperature of the influent and the effluent were close to each other and fluctuated according to the room temperature (21+ or −1° C.). It can be concluded that electrokinetic process did not change the temperatures significantly in the SMEBR in all the phases. In general, the order of change in temperatures in the SMEBR system was as following:

> Influent temperature>effluent
> temperature>Temperature in the Zone
> I>Temperature in the Zone II The temperature has an impact on the membrane performance because it affects the permeate viscosity. Because the influent temperature was almost constantly closed to the ambient temperature (20° C.) during the whole operation period, its impact on the SMEBR performance could not be observed in this research.

Figure 18:
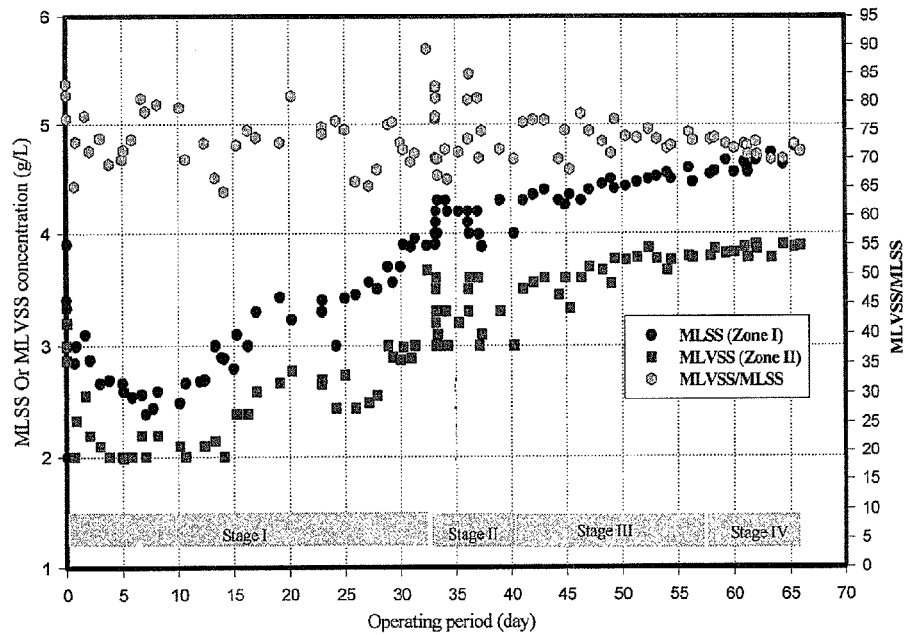
FIG. 18 is a graphical representation of the change in MLSS and the ML VSS concentrations with time during Phase III.

The development of the biomass concentration in the SMEBR system during Phase III was monitored by determining the MLSS and the MLVSS concentrations in the electro-bioreactor. Because the SMEBR system has two zones, the values of the MLSS and the MLVSS concentrations were presented as an average measurement in both zones (as it was done in Phase II). FIG. 18 shows the time-dependent variations of the sludge concentration in the electro-bioreactor. During the first 5 days of Stage I, the MLSS concentration decreased from 3300 mg/L to 2750 mg/L. This decrease was attributed to a decrease in the pH values of the SMEBR system that may have caused some microorganisms to die or to lose their viability. A few days after adjusting the pH influent, the MLSS began to be stabilized around 2700 mg/L until day 14.

The performance of the electro-bioreactor after 14 operation days was satisfactory; the sludge concentration increased slowly and reached an average of 3800 mg/L at the end of Stage I.

The MLSS concentration continued to increase after applying the DC field throughout Stages II, III, and IV. This trend indicates the viability of the microorganisms and the biodegradation processes. It appears that the performance of the organic degrading bacteria was not affected whereas the ammonia oxidization bacteria were exposed to the inhibition conditions of applying a DC field.

On the other hand, the investigation of the volatile fraction of total suspended solids revealed that MLVSS/MLSS was found to be stable within the range of 0.65 and 0.85 during Stage I, indicating no obvious accumulation of inorganic particulate compounds in the bioreactor. However, starting from the end of Stage II, the MLVSS/MLSS ratio demonstrated some decrease; the MLVSS/MLSS ratio was less than 75% beginning from day of 52 and it went down to 70% by the end of the operational Phase III. This trend implies that there was an accumulation of inorganic matter which started to build-up in the electro-bioreactor after applying the DC field.

According to the literature, the MLSS concentration in a bioreactor is usually considered one of the main parameters that may affect the MBR technology performance because of a complex interaction with the membrane module. However, the influence of the MLSS concentration on membrane fouling is not yet clear. However, according to a prior study, the flux decreased abruptly when the MLSS concentration exceeded 40,000 mg/L in a submerged membrane bioreactor. Another prior study investigated the effect of three different levels of MLSS concentrations (4000, 8000, and 12,000 mg/L) on membrane fouling in a submerged membrane bioreactor and they found that no significant difference was apparent between 4000 to 8000 mg/L, but that a significant decrease of permeate rate was observed when the MLSS concentration increased to 12,000 mg/L.

In Phase III of this research, the minimum value of the MLSS concentration in the SMEBR system was 2300 mg/L (day 7) and the maximum value was 4800 mg/L (day 65). During Stage I, the MLSS concentration was within the range of 2300 to 3800 mg/L. According to FIGS. 8 and 9, the membrane filtration performance reached a steady state after a few days from each event of membrane washing, suggesting that the changes occurred in the MLSS solution had no effect on membrane fouling within the developed MLSS concentration (i.e. 2300-3800 mg/L).

During the other stages, the MLSS concentration increased from 3800 mg/L to 4800 mg/L; within this range, it was assumed that the MLSS concentrations did not contribute significantly to membrane fouling, as the MLSS concentration was still less than 8000 mg/L. Consequently, the variations in the membrane flux during the operation of the SMEBR system may be attributable exclusively to the changes that occurred in physical/chemical properties of the MLSS solution after applying a DC field.

According to another prior study, the flocs formed by the EC process are relatively large and contain less bound water. They are also more stable and therefore amenable to filtration. This observation was confirmed in this research by applying a DC field to the MLSS solutions. Starting from Stage II, the results demonstrated that by using the electokinetic phenomena in the SMEBR system, the floc size of the MLSS solution was significantly affected. Beginning by Stage II, large and dense flocs appeared and they enhanced the overall performance of the liquid/solid separation processes. This was shown visually during the preparation the samples for the filtration purposes. The effect of large flocs reflected also in the sedimentation velocity which increased dramatically after applying the DC fields to the MLSS solution.

Figure 19:
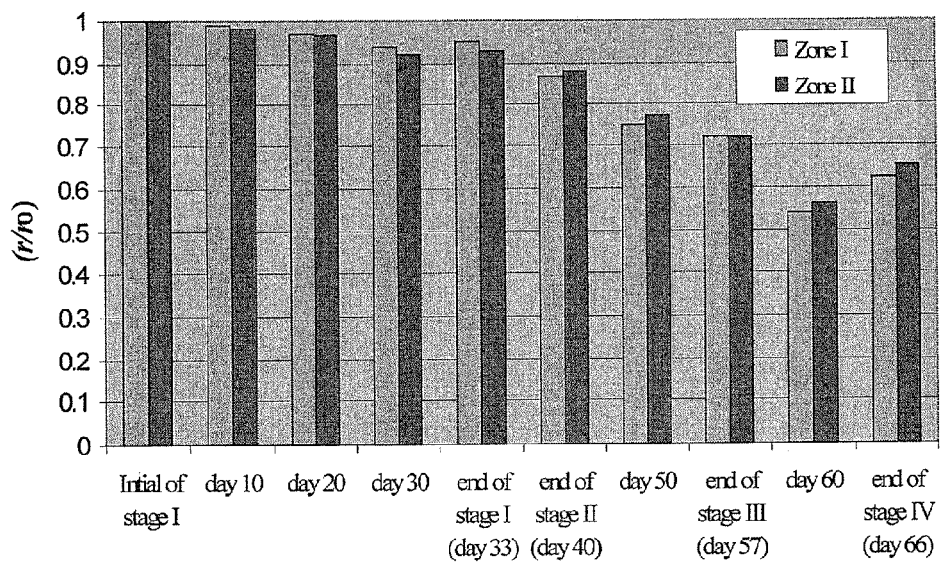
FIG. 19 is a graphical representation of the change of specific resistance to filtration of the MLSS solution during Phase III.

To find an empirical evidence of the above results, the specific resistance to filtration (SRF) of the MLSS solution particles in the electro-bioreactor's zones was measured every 10 days during the operation period as shown in FIG. 19.

All the measured filtration resistances were compared relative to the specific resistance to filtration of the MLSS solution at the beginning of the operation of the SMEBR system ($r_o$).

According to the Carman-Kozeny equation, the specific resistance to filtration (SRF) of the particles is inversely proportional to the square of particle diameter. Accordingly, the SRF is considered to be an indirect measurement of the size fractions of the particles.

The results of the SRF tests during Stage I did not show a considerable improvement in the SRF after 10 days of operation. This could be attributed to the fact that the particle size of the flocs did not growth well during the first ten days of operation where the MLSS solution decreased during the first five days as shown in FIG. 18.

A small improvement was observed in the SRF on day 20 and day 30 of the operational period which was attributed to a small increase in particle sizes and associated with an increase in the MLSS concentration. This agrees with a prior study based on the effect of the biosolids concentration on cake resistance during membrane filtration where it was found that particle size at the lower MLSS concentrations was smaller than at the higher ones.

On day 33 (the end of Stage I), no significant improvement was observed and the SRF decreased by 4% (on average) compared to the initial phase of the operation.

Although the permeate flux trend was unsatisfactory during Stage II (FIG. 9), a considerable improvement in the SRF was observed on day 40 (at the end of Stage II). The SRF decreased by 13% in comparison with the initial phase of the operation. This result is not in contradictory with the fact that an improvement in the SRF of the MLSS solution can improve the permeate flux. A reasonable explanation of the results of Stage II is the fact that the membrane module was not exposed to a chemical cleaning before its immersion in the electro-bioreactor.

The above conclusions were confirmed in Stage III where the membrane module was exposed to a physical and chemical cleaning before its operation. In Stage III on day 50, the SRF decreased by 25% and 23% in Zones I and II respectively, and decreased by 38% on average in both zones by day 57 (the end of Stage II).

The significant decrease in the SRF was observed throughout Stage IV. On day 60, the SRF had decreased by 46% and 44% in Zones I and II respectively. This situation was clearly associated with the PRPF=37% as is shown in the accompanying Figures.

Due to the mixing occurring between the two zones after the level switch failed on day 63, a decrease in the SRF was observed at the end of Stage IV; however, the SRF decrease was still higher than in previous stages (i.e. 38% in Zone I and 35% in Zone II).

The above results are in agreement with the reported literature about the significant role of the smaller size particles in the activated sludge on the membrane fouling phenomenon. It can be concluded form the results obtained from Phase III that the small colloidal particles, that are known to have greater capacity to build-up fouling resistance within the membrane pores, were destabilized and formed larger aggregates after applying the DC field, and led to an enhancement of the membrane's permeability. In addition, the application of an aluminum anode seemed to give an overall better protection of the membrane module.

According to the discussion presented in this and previous sections on the SRF and the MLSS concentration, it can be concluded that the size of flocs plays a more significant role on membrane fouling at lower levels of MLSS concentrations, than the MLSS concentration itself.

The improvement in membrane permeability within the SMEBR system can also be confirmed by measuring the zeta potential of the sludge flocs. According to theory, the zeta potential reflects the surface charge of sludge flocs. The magnitude of the zeta potential gives an indication of the potential stability of the colloidal system. If particles have a large negative or positive zeta potential, the dispersion is stable and it prevents the flocs' formation. If particles have low zeta potential values then the dispersion instability permits the formation of flocs as there is no significant force to prevent the particles coming together and aggregating.

Figure 20:
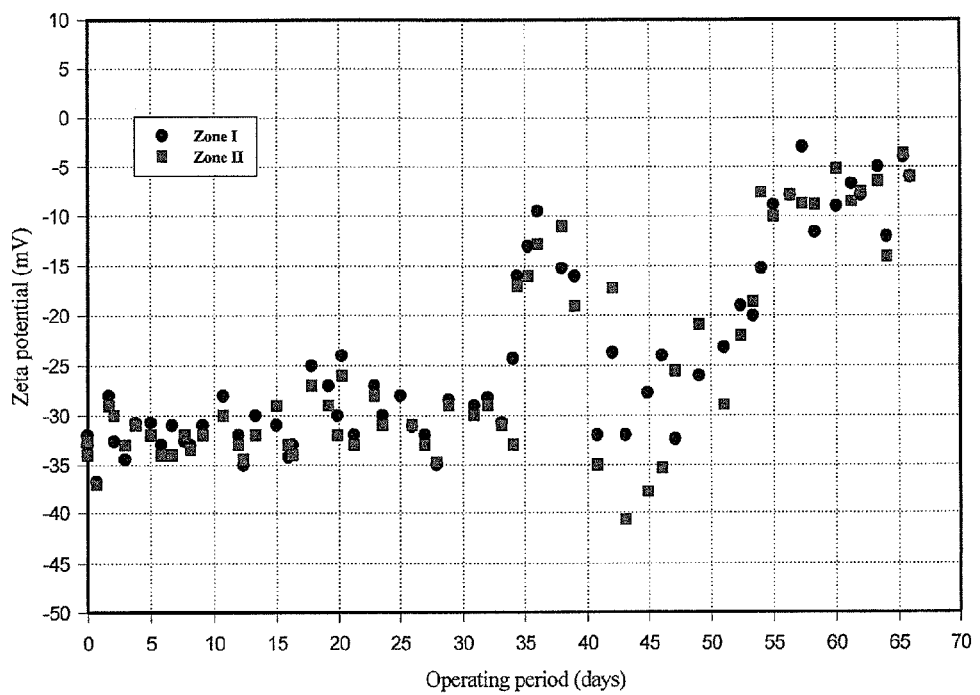
FIG. 20 is a graphical representation of the change in zeta potential with time in the SMEBR system during Phase III.

In Phase III, the potential for particle aggregation in the SMEBR system was verified daily by measuring the zeta potential of the particles in the supernatant after settling 50 ml of the mixed liquor for 30 min. The results of the zeta potential are presented in FIG. 20. During the first stage (DC=0 V/cm), no significant difference was observed in the zeta potential values in both electro-bioreactor's zones and the zeta potential fluctuated within the range of −26 to −37 mV, with average value of −32 mV. According to well known criteria, this value was closed to the zeta potential value of −30 mV required to achieve an electro-coagulation. This means that applying a low level DC field into the MLSS solution can reduce the forces that prevent the aggregation of particles; this case was demonstrated from the beginning of Stage II.

Starting from the Stage II (DC=1V/cm), the zeta potential of the particles in the supernatant shifted from −28.2 to −15.2 mV in Zone I and from −27.4 to −11.3 mV in Zone II. By the end of Stage II, zeta potential decreased to −19 mV in Zone I and to −21 mV in Zone II.

In Stage III, zeta potential stabilized at around −25 mV in both zones until day 51; thereafter, the zeta potential continued to decrease with time and reached −8 mV in both zones.

In Stage IV, the zeta potential decreased slowly to an average value of −4 mV in both zones, which means that the colloidal particles of the mixed liquor solution were closed to their isoelectric point (i.e. the point at which the colloidal particles are least stable).

These values can explain the significant improvement of flux during Stage IV when the permeate flux lost only 38% of its initial value.

Figure 21:
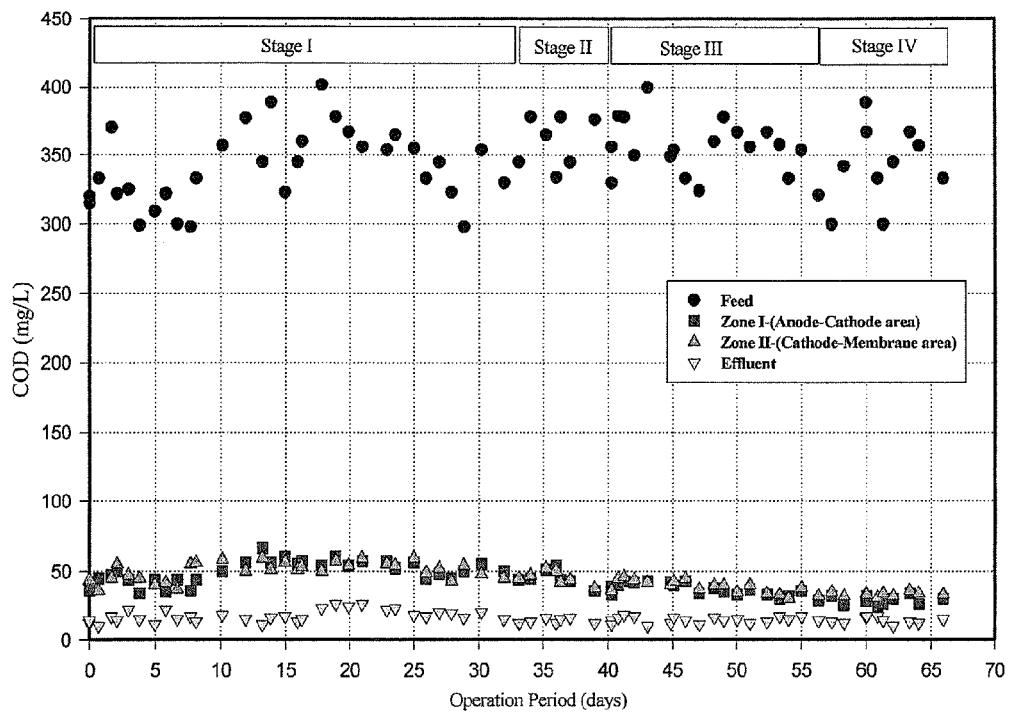
FIG. 21(a) is a graphical representation of the change in the COD concentrations with time in the SMEBR system during Phase III.
FIG. 21(b) is a graphical representation of the removal efficiencies of the COD concentrations in the SMEBR system during Phase III.
Figure 21:
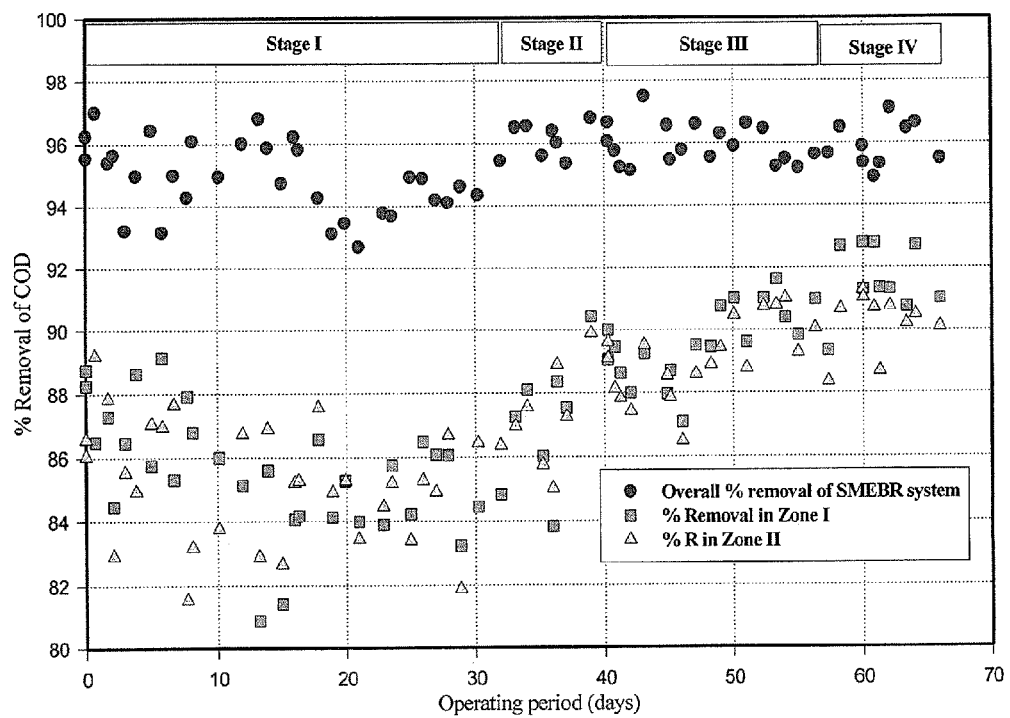

FIG. 21(*a*) illustrates the variations of the COD concentration in the influent, supernatant liquors in the two zones, and the membrane effluent throughout Phase III; whereas FIG. 21(*b*) illustrates the corresponding COD removal efficiencies in the electro-bioreactor (% R reactor) for both zones and for the overall performance of the SMEBR system (% R system).

While the removal efficiencies in the two zones varied between 80% and 88% during Stage I, FIG. 21(*b*) indicates that the overall system can provide consistently higher COD removal. The total COD removal efficiency of the system was maintained at a high level surpassing 93% because of the efficient filtration of the membrane module. This data confirmed that the membrane module played an important role in providing an excellent and stable effluent quality during the MBR processes. During Stage I, most of the COD fraction (80-88%) was degraded by the microorganisms in the electro-bioreactor, while the membrane module contribution was between 5-16% (FIG. 21(*b*) Similar result was obtained during Phase II of this research.

Although the overall COD removal efficiency remained stable at around 96%, beginning from Stage II until the end of Stage IV, the application of a DC field through the MLSS solution increased the COD removal efficiency in the two zones of elector-bioreactor. This observable fact can be attributed to the effect of the electro-coagulation phenomenon. When a comparison between Stage I (DC=0 V/cm) and the other stages is made, the designed SMEBR system can contribute 8% of the COD removal within the electro-bioreactor. Some fractions of organic matter in the mixed liquor have higher affinities with the membrane than do other fractions and consequently cause greater irreversible fouling. Membrane fouling may be caused not only by the microbial floc but also by the supernatant containing colloids and solutes. For a microporous size membrane, the main components of the activated sludge system that contribute to membrane fouling may be small size soluble and colloid components. Consequently, applying a DC field to the mixed liquor can reduced the load contributed by the organic matter on membrane fouling. This conclusion may explain the good performance of the SMEBR system during Stage III as well as Stage IV where the fouling rates decreased dramatically.

Figure 22:
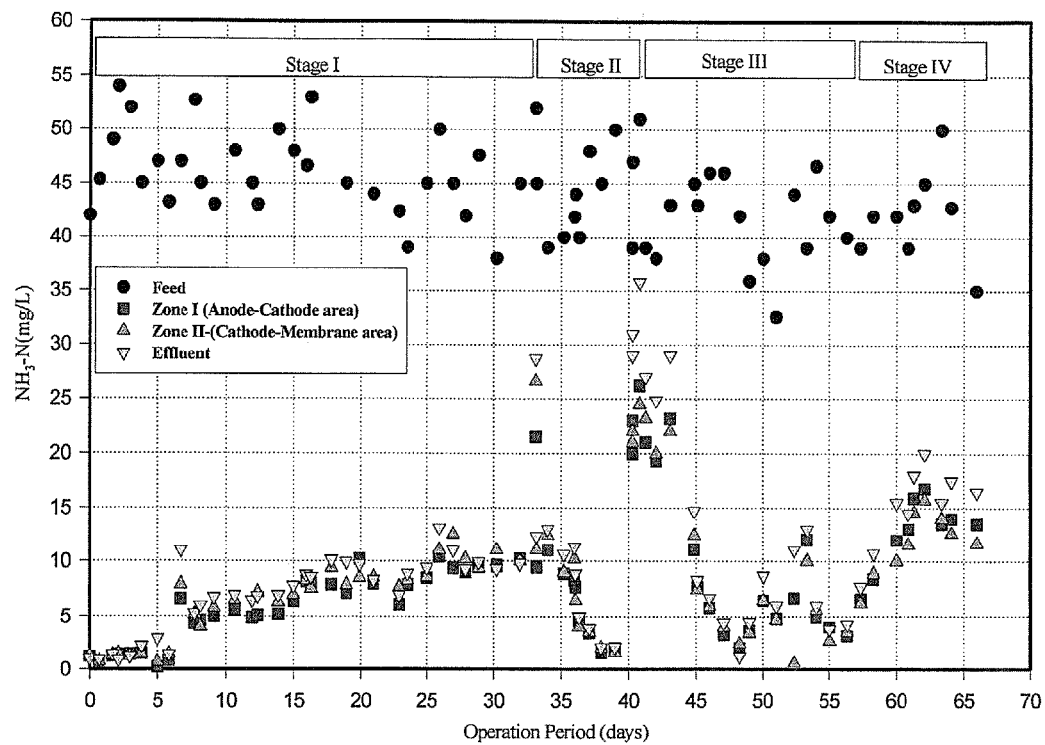
FIG. 22(a) is a graphical representation of the change in $NH_3$—N concentrations in the SMEBR during Phase III.
FIG. 22(b) is a graphical representation of the change in % removal of $NH_3$—N concentrations in the SMEBR system during Phase III.
Figure 22:
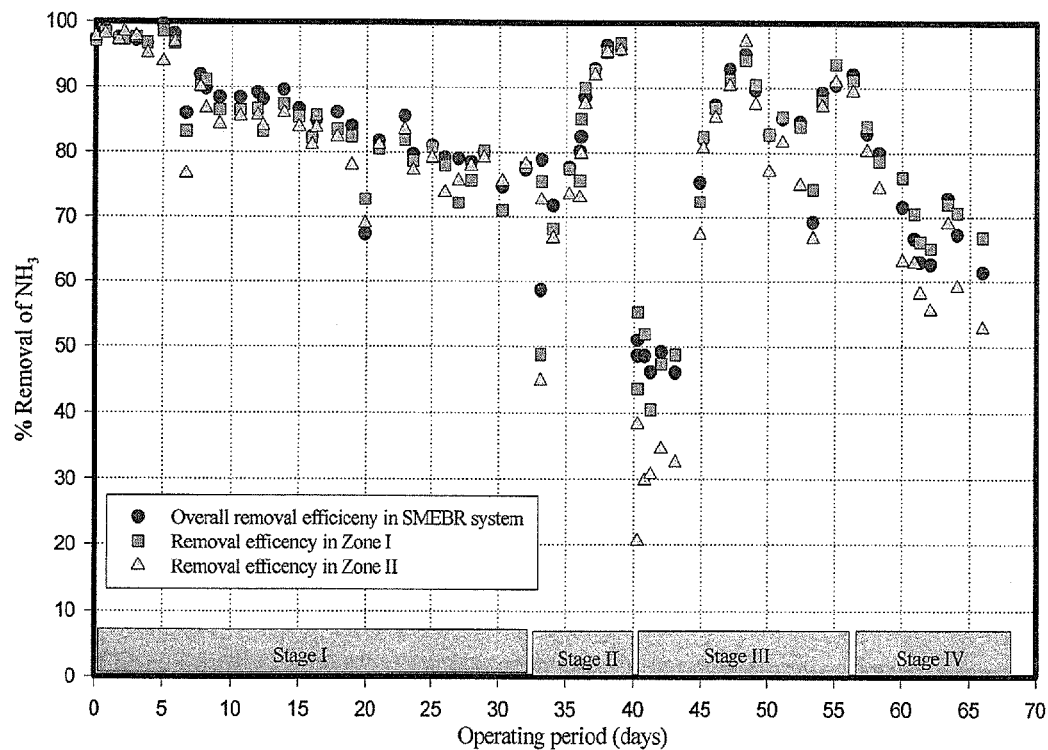

The change in ammonia concentration is often used as an indirect measurement of the changes in the nitrification process. The variations of the ammonia nitrogen ($NH_3$—N) concentrations in the influent, electro-bioreactor supernatant (in the two zones) and the membrane effluent are presented in FIG. 22 (*a*). The corresponding removal efficiencies of the SMEBR system are shown in FIG. 22 (*b*).

The influent $NH_3$—N varied between 32 and 54 mg/L, with an average of 45 mg/L.

The effluent $NH_3$—N concentrations fluctuated in each stage of Phase III.

In Stage I, where DC=0 V/cm, the effluent $NH_3$—N concentrations were below 1 mg/L during the first five days. In contrast to the result obtained in Phase II, a good oxidation of ammonia was observed during the first period of Stage I. The nitrification rate during the first 5 days of Stage I was 90-97%, and only a small fraction of free ammonia-nitrogen ions were found in the effluent. This result may be attributed to a sufficient generation of ammonia oxidizing bacteria before starting Phase III.

Beginning from the day 6, the $NH_3$—N concentration in the effluent started to increase and fluctuated until the concentration stabilized around 10 mg/L with average removal efficiency between 70-80%. The increase in effluent $NH_3$—N after day 6 can be attributed to a decrease in the pH (5-5.8) during this period, as illustrated in FIG. 12; this may have caused some inhibition for some nitrifying bacteria. The optimum range for ammonia oxidation bacteria occurs under neutral to moderately alkaline conditions, then, the decrease in the pH value might explain the reduction in ammonia oxidation observed from day 6.

When Stage II progressed (DC=1 V/cm, exposure time=15 minutes ON/45 minutes OFF), the effluent $NH_3$—N concentrations increased to 28.7 mg/L on day 34. This decrease in nitrification efficiency may have been the result of the shock exposure of the nitrogen bacteria to the DC field. However, the effluent $NH_3$—N concentration decreased again until it reached 2.1 mg/L at the end of Stage II, with $NH_3$—N removal efficiency above 93%.

In Stage III the same operating conditions as in Stage II was applied. The effluent $NH_3$—N concentrations increased until it reached 35.8 mg/L on day 41. However, the $NH_3$—N concentrations decrease again with time until it reached 4.5 mg/L at the end of Stage III.

The rapid increase in the $NH_3$—N concentration when the mixed liquor solution was exposed to the DC field in both Stage II and Stage III can be attributed to the sensitivity of nitrifying bacteria to a DC field; it appears that their sensitivity is more significant during the first hours of exposure time to a DC. This suggests that accumulation of aluminum in the reactor can give rise to a severe inhibitory effect on the activity of nitrifying bacteria. It has been previously confirmed also that the addition of the excess aluminum in the form of alum could have a negative effect on the nitrification rate of these bacteria.

The same behavior was observed in Stage IV. When the mode of operation of the DC field was altered to be 15 minutes ON 1105 minutes OFF, the $NH_3$—N concentrations began to increase with time and reached 17.6 mg/L by the end of Stage IV.

During the operational period, no significant difference in $NH_3$—N concentration in the elector-bioreactor supernatant between the two zones and the membrane effluent were observed, which implies that the $NH_3$—N removal was mainly achieved by the electro-bioreactor.

Figure 23:
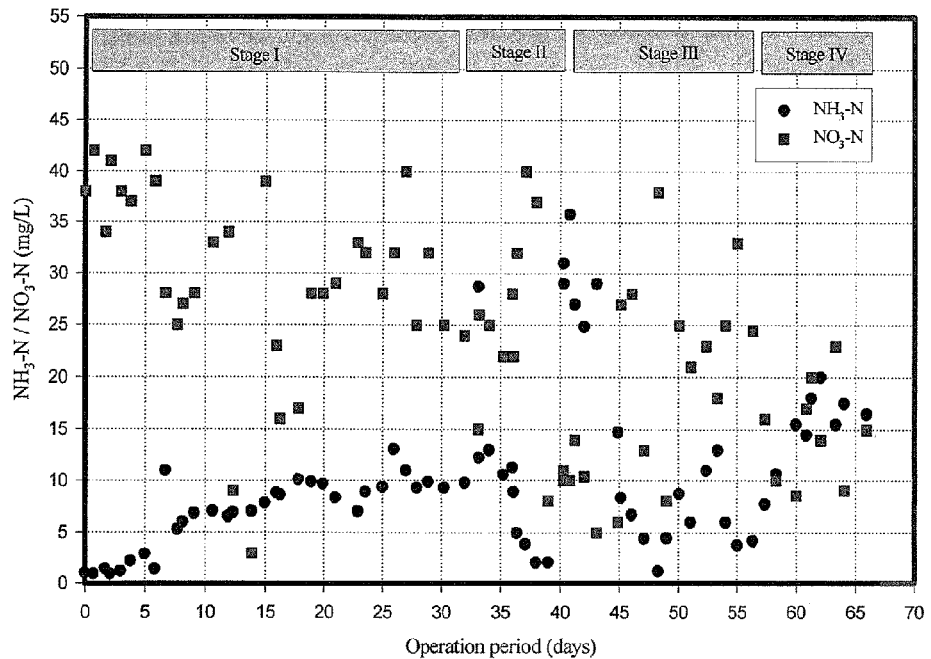
FIG. 23 is a graphical representation of the change in $NH_3$—N and $NO_3$—N concentrations in the effluent SMEBR system during Phase III.

To further confirm the impact of the SMEBR operation on the nitrification process, the nitrate nitrogen ($NO_3$—N) concentration in the effluent, as another indicator, is presented with the effluent concentration of $NH_3$—N in FIG. 23.

The nitrification rate in the reference stage (Stage I) was observed at the starting stages by oxidation of ammonia to nitrate. The nitrate nitrogen ($NO_3$—N) concentration in the effluent fluctuated in each stage also associated with the fluctuation of the $NH_3$—N concentration.

As it was the case in Phase II of this research, nitrite nitrogen $NO_2$—N) was not observed during the whole operational period of the SMEBR system.

During the first period of Stage I, the removal efficiency of $PO_4$—P in the two zones was approximately 95% and the removal efficiency in the effluent was about 97%. The sudden decrease in the $PO_4$—P removal in the two zones (less than 85%) and the relatively lower removal in the effluent appearing on day 6 corresponded to the lower MLSS concentration on that day. However, a few days later, the system increased its efficiency once more with an increase in the MLSS concentration in the electro-bioreactor. Although the phosphorus uptake fluctuated during the first stage due to the fluctuation in the MLSS concentration, the overall system showed good performance as the membrane module might have played an adsorbent support for phosphorous removal.

Starting from Stage II (day 33 to day 40), after applying a DC field into the MLSS solution, a dramatic increase in the $PO_4$—P removal was observed in the two zones.

This can be understood from the electrokinetic phenomenon that occurred in Zone I. The metal ions ($Al^{3+}$) began to appear in the MLSS solution forming aluminum hydroxide which functions as sweep flocs. These sweep flocs have large surface areas which is beneficial for the rapid adsorption of soluble phosphorus. The improvement in phosphorus uptake continuing during Stages III and IV was associated with the further increase of $Al^{3+}$ ions from the electrolysis of the aluminum anode.

These results demonstrated that during the first stage of operation, where no DC was applied, the concentrations of $PO_4$—P in both zones of the electro-bioreactor supernatants were similar to each other; while after application of DC, little differences were observed between the two zones. The concentration of $PO_4$—P in Zone I was on average less than 2-4% the concentration of $PO_4$—P in Zone II (the same phenomenon was observed in Phase II of this research). This is attributed to the coagulation phenomenon that occurred in Zone I. As the aluminum ions ($Al^{3+}$) are produced in Zone I, as a result of the electrochemical process, the phosphorous molecules reacted with aluminum ions to produce $AlPO_4$ and precipitated out of the sludge. Alternately, the aluminum ions ($Al^{3+}$) react with the hydroxyl ions ($OH^-$) produced at the cathode to form $Al(OH)_3$ flocs in Zone I. The phosphorous molecule will get a better chance to be adsorbed onto these flocs and precipitated out to the bottom of the reactor. In Zone II, where no electro-coagulation process took place, there is less chances for the available phosphorous molecules to react with aluminum ions; therefore, the removal efficiency of phosphorus in Zone II was less than the removal efficiency of phosphorus in Zone II.

As iron can affect the microbial activity, aluminum can also do so, therefore, in Phase III of this research, the specific oxygen uptake rate (SOUR) of the activated sludge was also determined in each zone in order to analyze the effect of applying a DC field on microbial activity.

Figure 24:
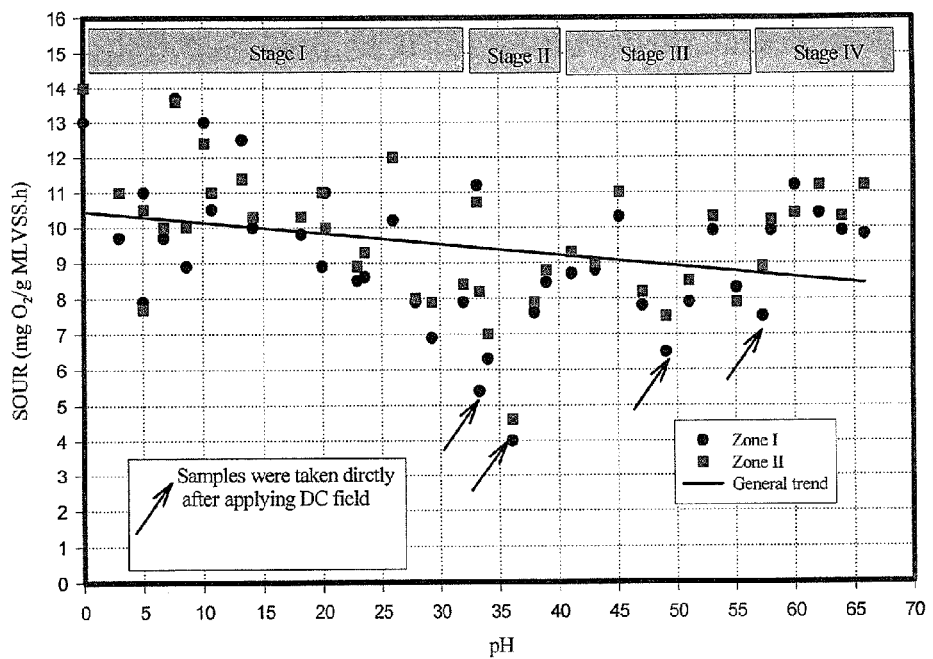
FIG. 24 is a graphical representation of the change in SOUR in the SMEBR system during Phase III.
Figure 25:
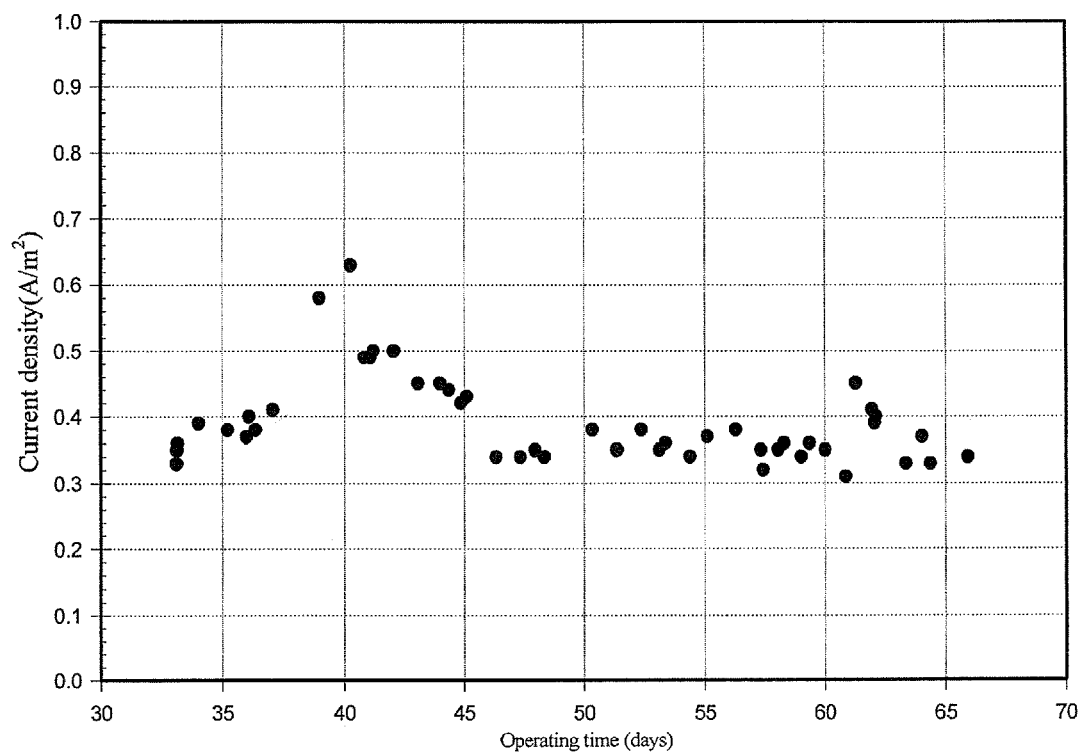
FIG. 25 is a graphical representation of the change of the current values in the SMEBR system during Phase III.

As shown in FIG. 24, during the first stages of operation of Stage I (reference stage); an obvious reduction in the microbial activity was observed. This was attributed to the acidic condition in the SMEBR system during this period of operation. After the pH in the system was adjusted to neutrality neutral level, an increase in the microbial activity was observed.

Starting from Stage II, a fluctuation in the microbial activity was observed during the SMEBR operation. It indicated that the weakness in the microbial activity was more pronounce when the samples from both bioreactor zones were taken immediately after applying a DC field to the MLSS solution. This behavior was also observed in Phase II of this research. These results imply that the microbial activity is very sensitive to a DC field, particularly during the application period of the DC field onto the MLSS solution.

Furthermore, the result from FIG. 24 demonstrated that the decrease in microbial activity was less pronounces in Stage IV in comparison with Stages II and III. This might be due to the fact that the exposure time to a DC field in Stage IV was less than the other stages because of the different operational modes.

However, not only can an applied DC field decrease the microbial activity, but also the long SRT can be seen to have a negative impact on the activity of the microorganism.

With respect to the impact of applying DC on the decrease of microbial activity on the removal efficiency of the pollutants, the treatment efficiency, in terms of COD and phosphorus, was not affected by the decrease in microbial activity whereas the effect of the DC was more obvious on the bacteria that are responsible for the nitrification process. The same phenomenon was observed in Phase II of this research.

In any wastewater treatment process, the economic analysis is a matter of concern. As the designed SMEBR system is based on applying a DC, it is necessary to study the variations in electrical parameters (current density, energy consumption, electrode material consumption) during the operation of the SMEBR system.

In Phase III of this research, the voltage was constant during the operation period (1 V/cm), while the current values changed with time. The current value was 0.35 A at the beginning of Stage II and it reached 0.63 A on day 42, after that the current value began to decrease with time until day 46, when it stabilized at around 0.34 A.

The fluctuation in the current values during these days was attributed to the changes in conductivity. An apparent explanation for these changes in electrical conductivity is the increase in the ionic content of the MLSS solution due to substrate degradation and electrolysis of the anode.

On day 63, the current value increased to 0.46 A due to the damage of the level switch. The SMEBR system was consequently shut down for maintenance and the electrodes assembly was taken from the elector-bioreactor which caused mixing the activated sludge content of the two zones. However, after two days of operation, the system had stabilized at around 0.34 A.

The most important electrical parameter which may affect the cost of wastewater treatment by the SMEBR system is the energy consumption. Calculation of energy consumption (E) is expressed as:

$$E = \frac{U \times I \times t}{V} \quad (5)$$

Where E is the energy consumption ($kWh/m^3$ wastewater treated). U is applied voltage (V), I is the current (A), t is retention time (s) (i.e. electro-coagulation time) and V is the volume of the treated wastewater ($m^3$).

Another parameter which can also affect the economical performance of the SMEBR system is the anode expenditure. Anode consumption (m) having a unit of $kg Al/m^3$ wastewater treated is calculated from Faraday's law in the following equation:

$$m = \frac{I \times t \times M}{Z \times F \times V} \quad (6)$$

Where M is the relative molar mass of the electrode concerned, Z is the number of electrons in oxidation/reduction reaction, and F is the Faraday's constant (96,500 C/mol).

In Phase III, the DC field was applied to the mixed liquor solution as a discontinuous operation throughout Stages II to IV, at different operational modes and different operating days. The following Table summarizes the energy and anode consumptions for each stage in Phase III.

| Items | Stage II | Stage III | Stage IV |
|---|---|---|---|
| Operation time (days) | 7 | 17 | 9 |
| DC exposure time (minutes) | 15 ON/ 45 OFF | 15 ON/ 45 OFF | 15 ON/ 105 OFF |
| Effective operating hours during each stage (h) | 56 | 136 | 30.86 |
| Average current during each stage (A) | 0.5 | 0.35 | 0.37 |
| Energy consumption (kWh) | 15.4 | 26.6 | 6.4 |
| Unitary daily energy Consumed ($kWh/m^3 \cdot day$) | 2.2 | 1.56 | 0.517 |

-continued

| Items | Stage II | Stage III | Stage IV |
|---|---|---|---|
| Unitary daily electrode Consumed (g/m³ · day) | 100 | 70 | 32 |

The results demonstrate that the energy consumption per cubic meter of the treated wastewater per operating day was more in Stage II in comparison to Stages III and IV. An energy reduction from 1.56 (kWh/m³.day) in Stage II to 0.517 (kWh/m³.day) in Stage IV was also observed. Furthermore, the electrode consumption reduced from 70 (g/m³.day) in Stage II to 32 (g/m³.day) in Stage IV. These were also associated with improvements in membrane flux in Stage IV. These results demonstrate the importance of the time operational mode on the SMEBR process.

Subsequently, in addition to the benefits of operating the SMEBR system at the operational mode of 15 ON minutes/105 minutes OFF in Stage IV of Phase III, this mode demonstrated a decrease in the consumption of energy by 66.8% than the other operational mode that was applied during Stage Ill. This benefit was mainly due to a lesser amount of exposure time to the applied DC field. Furthermore, the electrode consumption for the operating mode of 15 ON minutes/105 minutes OFF was reduced by 54.3% in Stage IV compared to the operational mode of 15 ON minutes/45 minutes OFF in Stage III.

In Phase III of this research, the SMEBR system was operated at constant transmembrane pressure mode where aluminum was used as an anode and iron as a cathode. The operational period was extended for 66 days and divided into four sequential stages. The conclusions of Phase III can be summarized by the following points:

Contrary of Phase II, the color of the MLSS solution in Phase III did not change with time during the operation and was found similar to the original color of MLSS solution. Also in this phase, water permeate quality had neither color nor odor.

Starting from Stage II (with a DC field applied to the MLSS solution), the results demonstrated an increase in the pH of treated suspensions. Also, the influence of electrokinetic process did significantly affect the floc size of the MLSS solution. Large and dense flocs started to appear during Stage II, which enhanced the overall performance of liquid/solid separation processes.

As Phase III extended during the four stages, the conclusions of each stage can be summarized by the following points:

Stage I –1-33 days: The system was operated without a DC field. The HRT fluctuated between 1.2 and 6 days, which was due to a declined flux resulting from the fouling phenomenon. The average COD removal of the system was 95% and an ammonia nitrogen removal efficiency of 90% was achieved by end of Stage I. The phosphors removal was greater than 96%.

Stage II 33-40 days: The system was operated with a DC field with a potential gradient of 1 V/cm and with an operational mode of 15 minutes ON 145 minutes OFF. The SMEBR system made significant improvement in COD and phosphorus removal (greater than 96% for COD and greater than 97% for phosphorus). The ammonia removal was 70%. However, the HRT increased to 57 days by the end of this stage reflecting an unsatisfactory filtration performance. Subsequently, it was suggested to begin the electro-coagulation process before operating the membrane module inside the electro-bioreactor. This would permit a proper electro-coagulation to take place before beginning the membrane filtration and thus decrease membrane fouling.

Stage III –40-57 days: The system was operated with a DC gradient of 1 V/cm and with operational mode of 15 minutes ON/45 minutes OFF, after washing the membrane (chemically and physically). Better membrane filtration performance was achieved in comparison with Stages I and II. During the first 5 days of the continuous operation, the percentage reduction in membrane permeability was 63% in Stage III, while in Stages I and II was 80% and 85% respectively (based on five days on the continuous operation).

Stage IV –57-66 days: The system was operated with DC field gradient of 1 V/cm and with an operational mode of 15 minutes ON/105 minutes OFF. This achieved significant improvement in membrane filtration efficiency, the percentage reduction in membrane permeability was only 38%. Furthermore, this mode was an improvement over the previous mode in terms of the pH variation within the SMEBR system. The date from this stage confirmed that the operational mode of the DC field is a key parameter in the performance of the SMEBR system.

In comparison with the two operational modes of DC applied during Phase III, the operational mode in the Stage IV (15 ON/105 OFF) demonstrated better results in terms of pH fluctuations within the SMEBR system. The pH values of all types of wastewaters in the system were within the range of 6.8-7.3. This result is considered another advantage of this operational mode in addition to the advantage obtained regarding the improvements in the permeate flux.

The output data of Phase III also demonstrated that, within the development of the MLSS during the operational period, the floc sizes had a significant effect on membrane fouling in comparison with the role of the MLSS concentration alone.

In this research, the submerged membrane electro-bioreactor (SMEBR) system was designed and investigated as novel wastewater treatment method to reduce membrane fouling and to enhance quality effluent. It was the first attempt to combine electrochemical science, biological and membrane filtration processes in one hybrid reactor.

The novel designed SMEBR system that was based on applying a DC field between immersed circular electrodes around membrane filtration module showed an efficient treatment of the synthetic mixed liquor solution simulating municipal sewage.

Two different anode materials—iron and aluminum—were used to validate the SMEBR system for wastewater treatment. The designed system demonstrated an excellent performance in decreasing the fouling rate. The applied DC field in the SMEBR system enhanced the membrane filterability up to 32% and 37% using the iron and aluminum electrodes, respectively, when the operating mode of DC was 15 minutes ON/45 minutes OFF. The significant improvement in membrane filterability was 62% when using the aluminum anode at an operational mode of 15 minutes ON/105 minutes OFF. This indicated that the operational mode of the DC supply is a key parameter in the operation of the SMEBR system. Furthermore, the SMEBR system showed a high removal efficiency of major wastewater components such as COD and nutrients. The overall removal efficiency for COD was greater than 96% and greater than 98% for phosphorus. In conjunction, the removal of $NH_3$—N was about 70%, on average. It should be empathized that the phosphorous removal efficiency was higher than other studies on MBR without electrokinetics. Furthermore, the effluent of the SMEBR treatment using synthetic wastewater had no color and no odor.

In term of pH changes within the SMEBR system, the pH values of the effluent were between 5.5 and 8.5; the range recognized as the best for microorganism performance. This also means that the effluent of the SMEBR system does not require further adjustment of pH.

The selected designed of the SMEBR system divided the treatment unit onto two main zones. The localization of the electrokinetic unit and the membrane filtration unit was adequate. The overall results demonstrated that the proposed design confirmed the hypothesis regarding the positive interaction of the three main processes: biological, electrokinetic and membrane filtration.

As described herein, for the first time biological processes, membrane process and electrochemical processes were integrated into one operational unit called the submerged membrane electro-bioreactor—SMEBR. This hybrid method appears to be more efficient than any other one presently used in wastewater treatment. The SMEBR contributes to: a) saving in the surface area needed for the treatment; b) increasing quality of the effluent; c) solving the membrane fouling problem; d) initiating research in new types of systems for more efficient wastewater treatment.

This new design has proven the beneficial interactions among three main processes and avoided successfully the potential undesired impacts. The electrical field applied for electro-coagulation does not significantly affect the biological processes in the electro-bioreactor. The generated electrokinetic phenomena did not show evidence for the deterioration of membranes material.

One of the main advantages of the selected design of the SMEBR system was the implementation of the electro-coagulation phenomena instead of conventional coagulation to increase the size of the floc particles, and further enhancing the membrane filtration process and improving the effluent quality.

This means that the current design: 1) combined all secondary and advanced wastewater treatment units into one, leading to a more adequate management of space, energy and costs; 2) omitted the requirements for chemical addition (the coagulation process occurs in the SMEBR system by electrokinetic phenomenon) leading to a higher quality of biosolids; 3) prevented pollutions of receptors by producing an excellent quality effluent in terms of color, pH, Chemical Oxygen Demand (COD), nutrient and metal content.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A wastewater treatment method for treating wastewater comprising:
    providing a treatment chamber having an effluent outlet;
    placing the wastewater to be treated in the treatment chamber;
    providing a filtration membrane spanning the effluent outlet;
    providing a pair of electrodes in the treatment chamber separate from the filtration member so as to be in communication with the wastewater;
    electrochemically treating the wastewater in the treatment chamber by applying an electrical potential difference between the electrodes such that one of the electrodes functions as an anode and one of the electrodes functions as a cathode;
    biologically treating the wastewater in said treatment chamber with biodegrading bacteria between the electrodes simultaneously with the electrochemical treatment by maintaining the applied electrical potential difference below a prescribed limit which would inhibit growth of the biodegrading bacteria; and
    subsequently filtering the electrochemically and biologically treated wastewater through the filtration membrane in the treatment chamber by inducing a flow of fluid in the wastewater out of the treatment chamber through the filtration membrane to the effluent outlet of the treatment chamber.

2. The method according to claim 1 including biologically treating the wastewater with nitrification bacteria by maintaining the applied electrical potential difference below a prescribed limit which would inhibit growth of the nitrification bacteria.

3. The method according to claim 1 including inducing the fluid flow only after the electrical potential difference has been applied between the anode and the cathode.

4. The method according to claim 1 including applying the electrical potential difference between the anode and the cathode before the wastewater is arranged to communicate with the filtration membrane.

5. The method according to claim 1 including applying the electrical potential difference to be cycled between a first state in the electrical potential difference is zero and a second state in which the electrical potential difference is non-zero.

6. The method according to claim 5 including arranging the second state to be different than the first state.

7. The method according to claim 1 including locating the cathode in the treatment chamber to define a second treatment zone between the cathode and the membrane and locating the anode in the treatment chamber to define a first treatment zone between the anode and the cathode which is outside of the second treatment zone, the first and second treatment zones being in communication with one another across the electrode therebetween.

8. The method according to claim 7 including locating the membrane and the outlet generally centrally in the treatment chamber and forming the anode and the cathode to be generally annular about the membrane.

9. The method according to claim 7 including positioning the cathode to be spaced partway between the anode and the membrane spanning the outlet.

10. The method according to claim 1 including forming the anode and the cathode to each comprise a conductive body having passages arranged to receive wastewater therethrough.

11. The method according to claim 1 including collecting metals in the wastewater adjacent at least one of the anode and the cathode.

12. The method according to claim 1 including forming flocculants in the wastewater by electro-coagulation.

13. The method according to claim 1 including forming the anode to comprise aluminium.

14. The method according to claim 1 including applying the electrical potential difference in the form of a direct current field gradient which is less than 20 V/cm.

15. The method according to claim 1 including providing an effluent pump having an inlet in communication with the outlet of the treatment chamber and inducing the flow of fluid out of the treatment chamber by operating the effluent pump.

16. The method according to claim 1 including injecting air into the treatment chamber adjacent a bottom end of the treatment chamber and at the outlet surrounded by the membrane.

17. The method according to claim 1 including applying the electrical potential difference between the electrodes such that the electrodes alternately function as the anode and the cathode.

18. The method according to claim 1 including applying the electrical potential difference between the electrodes in a form which alternates between a direct current between the anode and the cathode and an alternating current between the anode and the cathode.

19. A wastewater treatment method for treating wastewater comprising:
provide a treatment chamber having a waste inlet and an effluent outlet;
providing a filtration membrane spanning the effluent outlet;
providing a first electrode and a second electrode in the treatment chamber separate from the filtration member so as to be arranged for communication with the wastewater to be treated, the first and second electrodes being located such that the second electrode is spaced partway between the first electrode and the effluent outlet to define a first treatment zone between the first and second electrodes and to define a second treatment zone between the second electrode and the effluent outlet which is separate from the first treatment zone in which the first and second treatment zones are in open communication with one another across the electrode therebetween;
introducing the wastewater to be treated in the treatment chamber through the waste inlet;
electrochemically treating the wastewater in first treatment zone of the treatment chamber by applying an electrical potential difference between the electrodes such that one of the electrodes functions as an anode and one of the electrodes functions as a cathode;
biologically treating the wastewater in both the first and second treatment zones of the treatment chamber with biodegrading bacteria simultaneously with the electrochemical treatment by maintaining the applied electrical potential difference below a prescribed limit which would inhibit growth of the biodegrading bacteria; and
subsequently filtering the wastewater through the filtration membrane in the second treatment zone of the treatment chamber by inducing a flow of fluid in the wastewater out of the treatment chamber through the filtration membrane to the effluent outlet of the treatment chamber.

* * * * *